US011307282B2

(12) United States Patent
Holz et al.

(10) Patent No.: US 11,307,282 B2
(45) Date of Patent: Apr. 19, 2022

(54) DETERMINING POSITIONAL INFORMATION FOR AN OBJECT IN SPACE

(71) Applicant: Ultrahaptics IP Two Limited, Bristol (GB)

(72) Inventors: David S. Holz, San Francisco, CA (US); Robert Samuel Gordon, San Bruno, CA (US); Gabriel A. Hare, San Francisco, CA (US); Neeloy Roy, San Francisco, CA (US); Maxwell Sills, San Francisco, CA (US); Paul Durdik, Foster City, CA (US)

(73) Assignee: Ultrahaptics IP Two Limited, Bristol (GB)

( * ) Notice: Subject to any disclaimer, the term of this patent is extended or adjusted under 35 U.S.C. 154(b) by 1472 days.

(21) Appl. No.: 14/523,828

(22) Filed: Oct. 24, 2014

(65) Prior Publication Data

US 2015/0119074 A1    Apr. 30, 2015

Related U.S. Application Data

(60) Provisional application No. 61/895,965, filed on Oct. 25, 2013.

(51) Int. Cl.
*H04B 7/212* (2006.01)
*G01S 1/66* (2006.01)
(Continued)

(52) U.S. Cl.
CPC .............. *G01S 1/66* (2013.01); *G01S 5/0072* (2013.01); *G01S 5/0284* (2013.01); *G01S 5/12* (2013.01);
(Continued)

(58) Field of Classification Search
CPC ........................................................ G01S 5/10
See application file for complete search history.

(56) References Cited

U.S. PATENT DOCUMENTS

| 6,572,550 B2 * | 6/2003 | Miwa ................... G01S 7/52026 |
| | | 600/447 |
| 2003/0073463 A1 * | 4/2003 | Shapira .................. H01Q 1/246 |
| | | 455/562.1 |

(Continued)

OTHER PUBLICATIONS

Sep. 12, 2013; C.D. Measurements Ltd, Specialists in Engineering Metrology, How Interferometers Work; http://www.cdmeasurements.com/how_interferometers_work.htm.
(Continued)

*Primary Examiner* — Gary Lafontant
(74) *Attorney, Agent, or Firm* — Haynes Beffel & Wolfeld LLP; Ernest J. Beffel, Jr.; Paul A. Durdik

(57) ABSTRACT

The technology disclosed relates to determining positional information about an object of interest is provided. In particular, it includes, conducting scanning of a field of interest with an emission from a transmission area according to an ordered scan pattern. The emission can be received to form a signal based upon at least one salient property (e.g., intensity, amplitude, frequency, polarization, phase, or other detectable feature) of the emission varying with time at the object of interest. Synchronization information about the ordered scan pattern can be derived from a source, a second signal broadcast separately, social media share, others, or and/or combinations thereof). A correspondence between at least one characteristic of the signal and the synchronization information can be established. Positional information can be determined based at least in part upon the correspondence.

20 Claims, 25 Drawing Sheets

(51) Int. Cl.
*H04W 4/50* (2018.01)
*G01S 5/02* (2010.01)
*G01S 5/00* (2006.01)
*G01S 5/12* (2006.01)
*H04W 4/02* (2018.01)

(52) U.S. Cl.
CPC ........... *H04W 4/026* (2013.01); *H04W 4/027* (2013.01); *H04W 4/50* (2018.02)

(56) References Cited

U.S. PATENT DOCUMENTS

| | | | |
|---|---|---|---|
| 2007/0004464 A1* | 1/2007 | Lair | H04M 1/6066 455/569.1 |
| 2009/0149202 A1* | 6/2009 | Hill | G01S 5/0289 455/456.6 |
| 2011/0022393 A1* | 1/2011 | Waller | G01C 21/3608 704/270 |
| 2011/0210887 A1* | 9/2011 | Eisen | G01S 5/06 342/357.25 |
| 2014/0123075 A1* | 5/2014 | Champion | G06F 17/30873 715/853 |
| 2014/0265810 A1* | 9/2014 | Livesay | F21V 29/006 313/12 |

OTHER PUBLICATIONS

Arun Natarajan, et al; Dec. 2006; 0018-9200, IEEE Journal of Solide State Circuits, vol. 41, No. 12; A 77-GHZ Phased-Array Transceiver With On-Chip Antennas in Silicon: Transmitter and Local Lo-Path Phase Shifting.

Y. Huang et al; Feb. 2011; Progress in Electromagnetics Research, vol. 115, 327-342 pages; FMCW Based MIMO Imaging Radar for Maritime Navigation.

Wikipedia, "VHF Omnidirectional Range," Wikipedia The Free Encyclopedia, last modified Oct. 21, 2014, Retrieved online: <http://en.wikipedia.org/wiki/VHF_omnidirectinal_range> on Oct. 2014, 22 pages.

* cited by examiner

Position = red peak - blue peak

In one embodiment, label alternating peaks 0 or 1 with amplitude modulation to know which red peak to subtract from which blue peak.

Otherwise, there are two possible solutions.

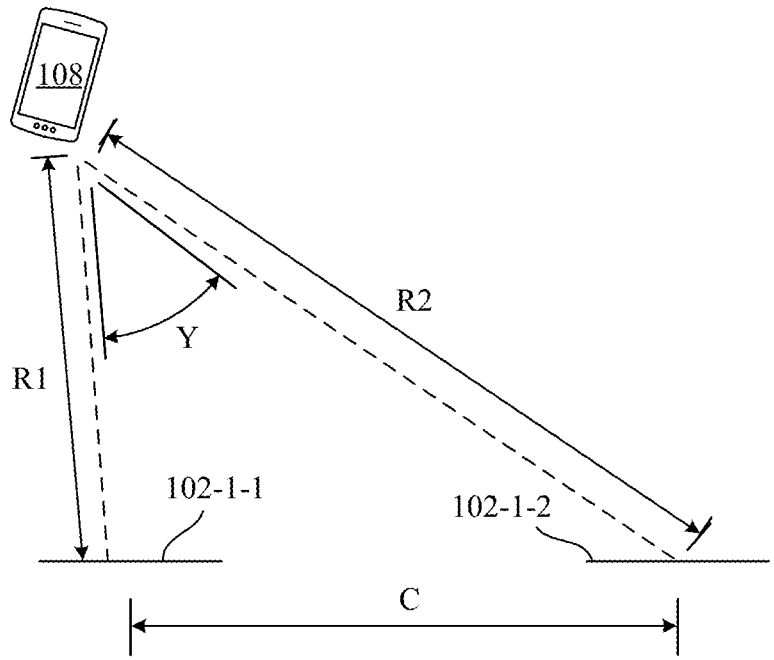

$$\begin{cases} P_0 := \text{transmission power of each element of phased array} \\ P_x = \text{received power of tracked object in terms of amplitude of Fourier transform} \\ R_{1,2} = \text{distance to elements of phased array transmitter 1,2} \end{cases}$$

$$\begin{cases} P_1 = \dfrac{P_0}{4\pi R^2_1} \\ P_2 = \dfrac{P0}{4\pi R^2_1} \end{cases}$$

$$\begin{cases} \text{So} \\ R^2_1 = \dfrac{P_0}{4\pi P_1}, R^2_2 = \dfrac{P_0}{4\pi P_2}, \\ \text{So} \\ R_1 = \sqrt{\dfrac{P_0}{4\pi P_1}}, R_2 = \sqrt{\dfrac{P_0}{4\pi P_2}} \end{cases}$$

So the angle Y the tracked object forms between the two ends of the antenna is:

$c^2 = a^2 + b^2 - 2ab \cos \gamma$          (by the law of cosines)

$\gamma = \arccos\left(\dfrac{a^2 + b^2 - c^2}{2ab}\right);$

FIG. 7B

DETERMINING POSITIONAL INFORMATION FOR AN OBJECT IN SPACE

PRIORITY DATA

This application claims the benefit of U.S. Provisional Patent Application No. 61/895,965, entitled, "DETERMINING POSITIONAL INFORMATION FOR AN OBJECT IN SPACE," filed on Oct. 25, 2013. The provisional application is hereby incorporated by reference for all purposes.

TECHNICAL FIELD

This technical disclosure relates generally to determining positional information and more specifically to the use of ordered scan patterns to derive positional information for an object of interest in space.

DISCUSSION

Humankind did not venture far from the cave before it became apparent that a way to determine where one is, and how to get back home, was needed. Landmarks, i.e., trees, rivers, etc., were used as reference points from which early humans could determine where they were. The concept of time—manifesting itself in the need to return home before nightfall—lead the early humans to consider a journey in terms of time to travel (e.g., a half day's walk, one day's walk). Periods longer than a day could be marked using the presence and paths of the moon, planets and stars, enabling human migration by seasons. Later, humans developed tools to determine their position with reference to stars and sun (sextant), magnetic fields of the earth (compass) and much later by meridians of longitude (chronometer). By accounting for time in addition to using these tools, humans developed "dead reckoning" to determine their position based in part on how long they've travelled from the last known point. Accoutered with these instruments and methods, human kind became free to voyage about the globe.

Technical development moved next to replacing natural phenomena (e.g., stars, magnetic fields) with artificial "landmarks" like satellites. GPS, a system of satellites circling the earth that broadcast their position and time to anyone willing to listen provides a ready set of "landmarks" with which humankind can determine position.

Unfortunately, such conventional techniques do not work well for more precise determinations and/or determinations made over shorter distances. The accuracy of such conventional measurements depends heavily on being able to transmit and receive a signal from an incredibly far distance. GPS, for example, functions very poorly—or not at all—indoors or in urban landscapes. The result is that the distances computed using conventional techniques may be inaccurate, unusable, or unavailable some of the time or in some areas, rendering such techniques useless in many applications.

Therefore, better methods are needed for determining positional information about objects.

SUMMARY

Aspects of the technologies described herein provide for determining positional information (e.g. location, distance, and/or depth) for at least a portion of an object of interest within a field of interest. Among other aspects, embodiments can enable objects and/or their users to automatically (e.g. programmatically) determine positional information using one or more of a variety of techniques including social network sharing of information, signal property analysis, biometrics and/or combinations thereof in conjunction with conducting guidance to/from points of interest through congested areas, flow control, user identification, privacy assurance, providing input, commands, communications, and/or other user-machine interfacing, gathering information about objects, events and/or actions existing or occurring within an area being explored, monitored, or controlled, and/or combinations thereof.

In one embodiment, a method for determining positional information about an object of interest is provided. The method includes conducting scanning of a field of interest with an emission from a transmission area according to an ordered scan pattern. Scans may be continuous or discontiguous. The emission can be received to form a signal based upon at least one salient property (e.g., intensity, amplitude, frequency, polarization, phase, or other detectable feature) of the emission varying with time at the object of interest. Synchronization information (e.g., a particular angle of a sum emission at a known point in space at a known time as seen from the emitter) about the ordered scan pattern can be derived from a source (e.g., the emission itself, a component of the emission (i.e., sub-channel, etc.), a second signal broadcast separately, social media share, others, or and/or combinations thereof). A correspondence between at least one characteristic of the signal and the synchronization information can be established. Positional information can be determined based at least in part upon the correspondence.

In an embodiment, the correspondence is established by determining that some signal characteristic (e.g., a double peak in an Intensity vs. time signal) corresponds to a synch "chirp" (i.e., a nearest synch max to nearest synch chirp gives some number between 0-360 degrees)).

In an embodiment, positional information is derived by translating the correspondence (e.g., some degrees from 0-360) into an angular position about the emitter.

In an embodiment, one or more emitters in the transmission area can be selectively powered on (e.g. one-at-a-time, in groups, sequentially or according to some pattern), pulsed, cross-faded, or any combination thereof to advantageously "scan" a field of interest. A scan may comprise a digital pulsing, a continuous variation of amplitude or intensity, or any combination thereof. A scan can include an ordering such that different areas in the field of interest receive characteristic emission from the transmission area corresponding to the ordering of the scan pattern. In embodiments, an ordering of emissions in an ordered scan pattern reflects "timing", which may comprise but is not necessarily limited to the time in which certain emissions take place. Receivers in proximity to the object of interest capture the emission (e.g. radio antennas, microphones, photodiodes, CCD array and/or CMOS array and/or other types of devices capable of converting a salient feature of the received emission over time into current or voltage and/or combinations thereof) as a signal over time. A synchronization method can be used to obtain information about the timing of the ordered scan pattern. A mechanism in hardware or software can be used to compare the timing information to the signal over time and extract positional information.

In an embodiment, a method for determining positional information about an object of interest is provided. The method can include receiving a signal broadcast according to an ordered scan pattern (e.g., a wave front, rotating signal beacon, etc.) within a field of interest. The method can include determining from the signal an occurrence of a property of interest (e.g., peaks, troughs, etc.) within the ordered scan pattern and a corresponding occurrence time for the point of interest. The method can also include determining synchronization information indicating a time of occurrence of the point of interest within the ordered scan pattern as would be experienced at a reference point (e.g., an index, designated zero position, or equivalent information encoded either in the broadcast or separately). Positional information can be determined from the synchronization information and the occurrence time or ordering within the ordered scan pattern for the point of interest.

In some embodiments, the synchronization information is determined by identifying a second point of interest in the ordered scan pattern; and determining a difference in time between a time of occurrence of the second point of interest and the occurrence time for the point of interest. The second point of interest can be a pause, pulse, or other identifiable feature in the ordered scan pattern.

In yet further embodiments, the synchronization information is determined from an AM component of the radiation the time of occurrence of a point of interest within the ordered scan pattern as would be experienced at a reference point.

In still yet further embodiments, the synchronization information is determined from a signal broadcast by a source of the radiation the time of occurrence of a point of interest within the ordered scan pattern as would be experienced at a reference point.

Advantageously, these and other aspects enable machines, computers and/or other types of intelligent devices to obtain positional information about themselves relative to transmission areas, including but not limited to depth, location, orientation, structure, velocity, or any combination thereof. This information can be obtained faster and more reliably in certain application than the existing art. These and other advantages and features of the embodiments herein described, will become more apparent through reference to the following description, the accompanying drawings, and the claims. Furthermore, it is to be understood that the features of the various embodiments described herein are not mutually exclusive and can exist in various combinations and permutations.

BRIEF DESCRIPTION OF THE DRAWINGS

A more complete understanding of the subject matter can be derived by referring to the detailed description and claims when considered in conjunction with the following figures, wherein like reference numbers refer to similar elements throughout the figures.

FIG. 5-1 illustrates one embodiment in which a transmission area transmits an emission comprising an ordered scan-pattern such that two sum emissions "sweep" the field of interest from opposite directions.

FIG. 5-2 illustrates an alternative embodiment of a process for producing scans that sweep the field of interest in opposite directions.

FIG. 5-2*a* shows generation of a mixed signal based on low and high components of frequencies.

FIG. 5-2*b* illustrates one embodiment of what FIG. 5's mixed sum emission looks like as a signal of intensity over time captured by one or more receivers on an object of interest within a field of interest.

FIGS. 7A-7C illustrate various position determination techniques that might be employed in accordance with some embodiments.

FIG. 8-1 depicts one embodiment of coupling emitters with other materials or devices.

FIG. 8-2 shows one embodiment of interleaving arrays of image capture device(s).

FIGS. 9-1 and 9-2 illustrate prediction information including models of different control objects.

FIGS. 9-3 and 9-4 show interaction between a control object and an engagement target.

DETAILED DESCRIPTION

Described herein are various embodiments of methods and systems for determining the distance, position, orientation, depth or other positional information of an object in space. Embodiments can provide improved accuracy in positional and/or depth information capable of supporting object or object surface recognition, object change, event or action recognition and/or combinations thereof. An embodiment provides for determining positional information (e.g., a relative distance, position, orientation depth, or other information about an object of interest) relative to a reference transmission area using a reference ordered scan pattern. Objects of interest (i.e., an object for which positional information is determined) can include people, robots, devices, portions thereof, or any combination thereof. In an embodiment, positional information for an object of interest can be determined with application of one or more receivers or filters, which may be integral with, in proximity to, and/or co-located with the object. In another embodiment, objects of interest can have one or more transmitters, which may be integral with, in proximity to, and/or co-located with the object.

Figure 1A:
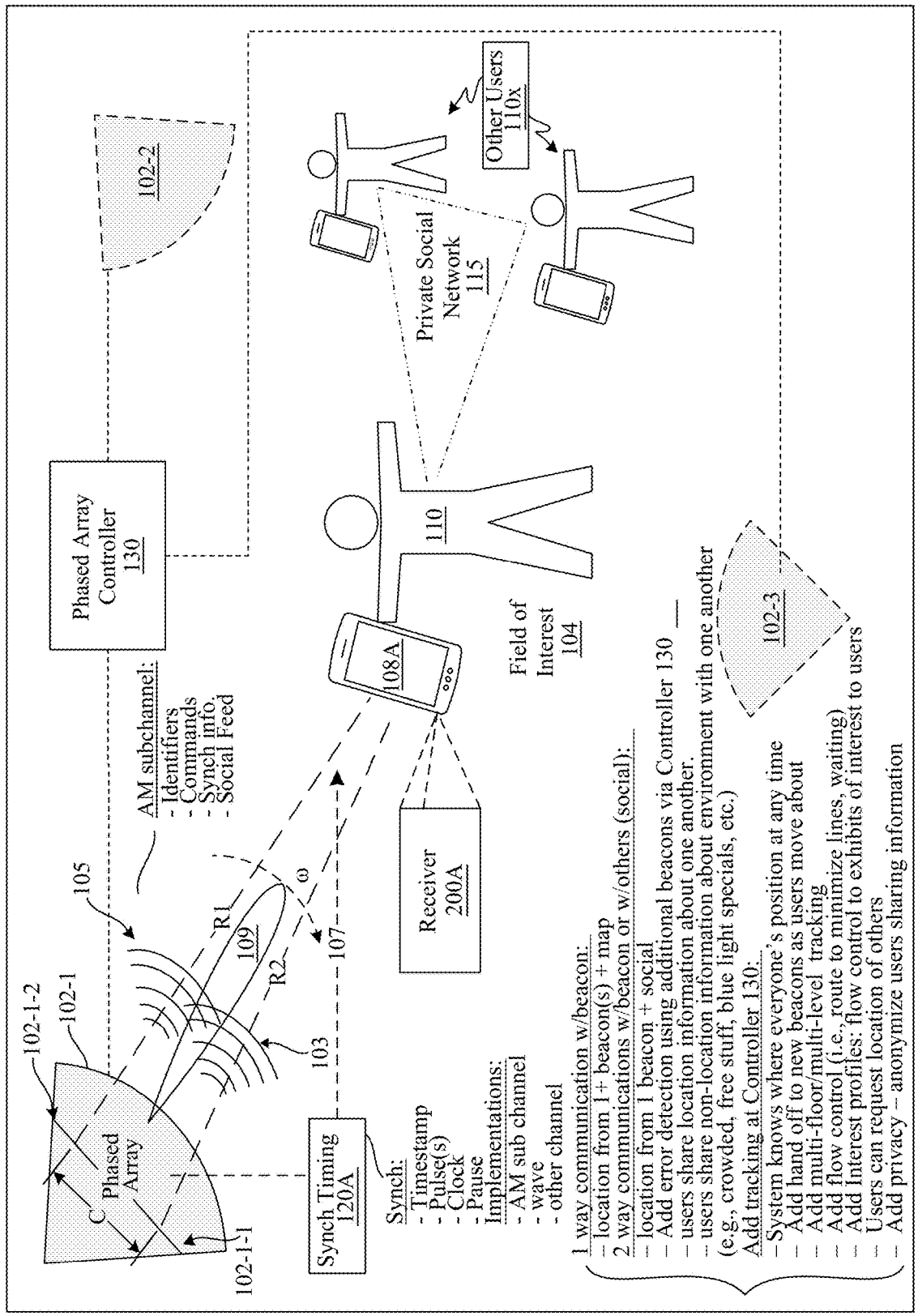
FIGS. 1A-1B illustrate exemplary recognition environments in which embodiments can be realized.

FIG. 1A illustrates an exemplary recognition environment in which embodiments can be realized. As shown in FIG. 1A, an object of interest 108A (comprising a receiver 200A) located within a field of interest 104 determines its position (i.e., positional information) relative to one or more beacons (non-fixedly located at transmission areas 102-1, 102-2, and 102-3) from which object 108A receives emissions. While illustrated in FIG. 1A as to receivers and transmitters within field of interest 104, receiver 200A and/or transmission areas 102 can be embodied as transceivers, portions of transceivers, separate transmitter and receiver apparatus, and/or other arrangements not shown in FIG. 1A for clarity.

In an embodiment, transmission area 102-1 includes two emitters (or emitting elements) 102-1-1 and 102-1-2, which form a phased array that radiates emissions 103, 105 having distinct properties (i.e., frequency, wavelengths, polarization, etc.) according to an ordered scan pattern that defines set of characteristics of the emission. For example, one ordered scan pattern can include characteristic frequencies, timings, reference points for starting/stopping a scan cycle, etc. that form a directive radiation pattern 109 that scans field of interest 104 (e.g., at an angular velocity of ω). In one embodiment, emissions 103, 105 comprise radio frequencies, however, other types of electromagnetic emission, other wave emitting energy sources having a salient feature of the emission that can be received as a signal over time, (e.g., a peak in time varying amplitude, a position of a time varying wave front formed by constructive interference of two or more waves, etc.), and/or combinations thereof, can be used. A phased array controller 130 controls emitting elements 102-1-1, 102-1-2 enabling transmission area 102-1 to function as a phased array to produce emissions according to the ordered scan pattern, such as for example producing a beat frequency. In embodiments, controller 130 can also control other transmission areas 102-2, 102-3 to provide additional signals to receiver(s) within field of interest 104, enabling the receiver(s) to determine improved positional information using combinations of two or more signals from different sources. While illustrated in FIG. 1A as coplanar and disposed to scan field of interest 104 along a horizontal plane, transmission areas 102-1, 102-2, and 102-3 can be disposed in non-coplanar arrangements, on different floors of a building, or different heights (or levels) of an urban landscape. Other transmission areas not shown in FIG. 1A for clarity, can be added to provide additional scanning of field of interest 104.

In an embodiment, a synchronization mechanism 120A is employed so that the receiver 200 can obtain synchronization information 107 (e.g., timing, ordering, component frequencies, etc.) of the ordered scan pattern. Receiver 200A can use the synchronization information to determine from the emission as received a position of the receiver 200A relative to a reference position using a point of interest (e.g., peak, trough, number of cycles, phase difference, etc.) in the emission as received and an indication (e.g., a chirp, pulse, timestamp, etc.) of when the same point of interest in the emission occurred at the reference point. Synchronization information 107 can comprise any type of information indicating a reference point which device 108 can use to determine its relative position based upon differences perceived in the emission by device 108 and the indicated reference point information. In one embodiment, synchronization information 107 indicates a time of occurrence of a point of interest within the emission as would be experienced at a reference point (actual or hypothetical). As illustrated in further detail by FIG. 4, synchronization information 107 indicates a point in the emission when a point of interest occurred at a reference point for the transmission area 102-1, which the receiver 200A can use to measure a difference in time between occurrences of a point of interest in the emission at the reference point and at the receiver. While illustrated herein with reference to a difference in time of occurrence, synchronization information could also be expressed in an angular or linear position.

Receiver 200A can include any or a combination of computational, mechanical, physical, or electrical mechanisms or apparatus enabling receiver 200A to receive the emission as signals, determine from the emission a point or points of interest in the signal occurring at various points, synchronize the signal to a reference indicating a time that the point of interest in the scan occurred at a reference point (actual or virtual), and determine positional information from the time of the occurrence of the point of interest in the scan experienced by the receiver, and the time of occurrence of the of the point of interest as would be experienced at the reference point.

The receiver receives the emission from a transmission area and detects a salient feature of the emission as a signal over time, (e.g., a peak in time varying amplitude, a position of a time varying wave front formed by constructive interference of two or more waves, etc.). The receiver next determines positional information by identifying a correspondence between information about the timing of the ordered scan pattern and a property of the signal. For example, changes in the emission reflecting the ordered scan pattern may translate into a continuous variation of intensity in one spatial dimension in the received signal. Example receiver embodiments illustrated by FIGS. 2A-2B include software and/or hardware, to determine positional information based on emission 103, 105. Techniques for determining synchronization information will be described in further detail below for a variety of example embodiments and with reference to FIGS. 4, 5 and 6A-6C. Techniques for determining positional information will be described in further detail below for a variety of example embodiments and with reference to FIGS. 7A-7C.

In some embodiments, device 108A includes one-way communications capability with transmission area 102. In one of these embodiments, one-way communications capability enables a user to determine location from one or more transmission area(s) and a map (or similar information) stored at device 108A or otherwise. In other embodiments, device 108A includes two-way communications with transmission area 102-1 and/or with others, preferably using a social media component. In one of these embodiments, device 108A can determine location from one or more transmission area(s) and social media (or other intra-user communication) component. Using social media, users can share location information with one another via device(s) 108A. Also, some embodiments support users sharing non-location information (e.g., crowded, free stuff, blue light specials, etc.) about environment with one another.

In some embodiments, positional information is acquired from additional transmission areas 102-2, 102-3. The additional positional information is compared with the positional information from transmission area 102-1 to provide error detection. In an embodiment, phased array controller 130 coordinates positional information of multiple transmission areas to provide accuracy checking and error detection. Alternatively or additionally, social media capabilities can be provided in the form of a private social network 115 enabling users to cross-check positional information with one another.

In some embodiments, controller 130 includes device tracking capability. Accordingly, in such embodiments the system can track where everyone is at any given time. Tracking capability can be implemented in a variety of ways, including for example and in embodiments, a database of devices (and user identifiers, anonymized or non-anonymized) which is populated either when devices 108A initiate communications with one or more transmission areas 102.

In an embodiment, as users move about field of interest 104, the transmission areas 102 can "hand off" the user to one another when the user moves from the range of one and into the range of another.

In an embodiment, controller 130 can manage transmission areas of different levels and floors to track users changing floors or levels, enabling the system to provide multi-floor/multi-level tracking.

In an embodiment, controller 130 includes flow control techniques to conduct routing of users according to a criterion (i.e., route to minimize lines, waiting).

In an embodiment, controller 130 includes interest profiles of users. Using interest profiles, controller 130 can provide routing of users to exhibits of interest.

In some embodiments, users can request the location of other users from the controller 130. In some embodiments, user identity can be anonymized to protect users, but still share location information with other users to enable the other users to determine their position relative to one another.

Figure 1B:
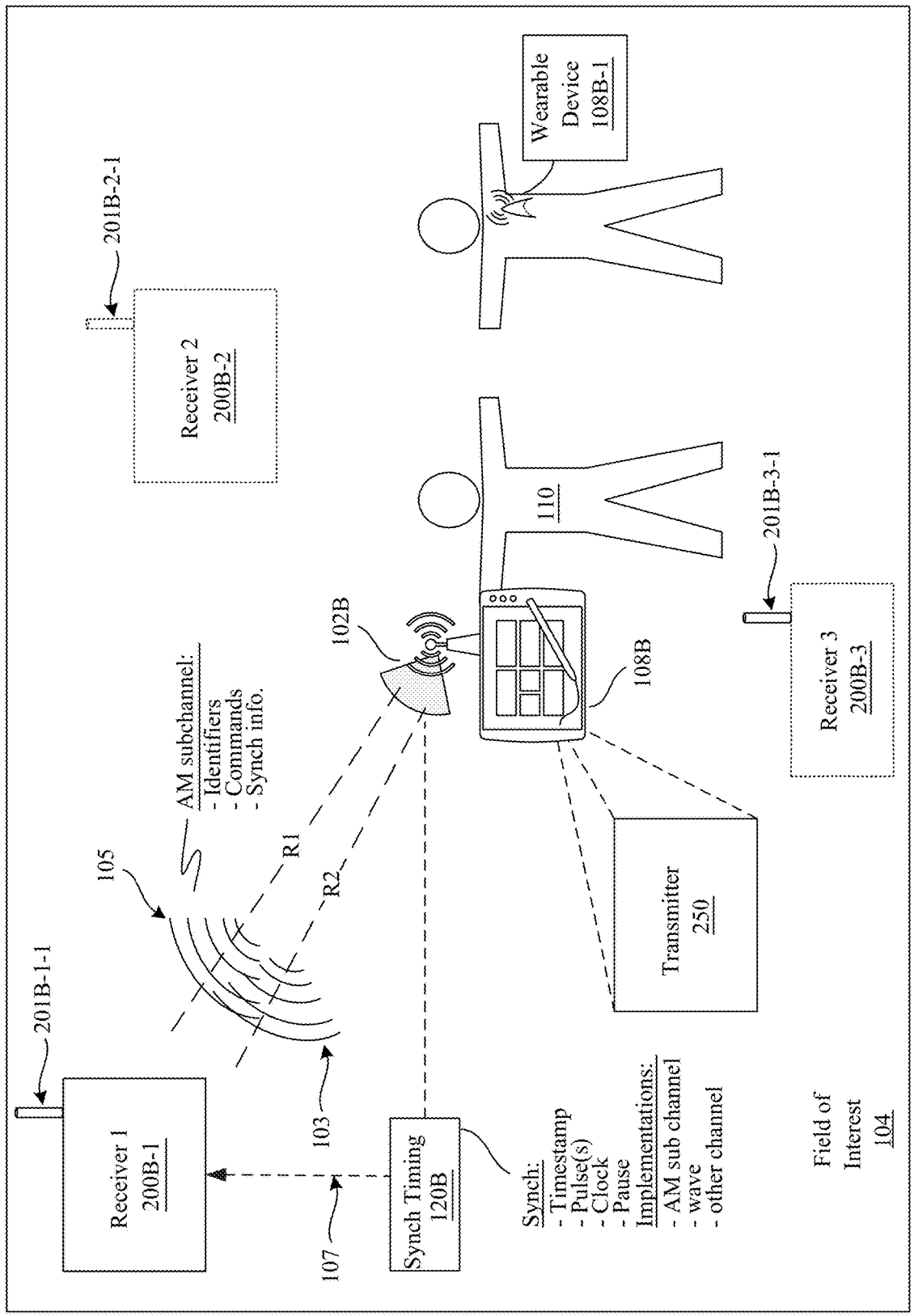

FIG. 1B illustrates another exemplary recognition environment in which embodiments can be realized. As shown in FIG. 1B, receiver 200B-1 is adapted to be useful in conjunction with a fixed (or semi-fixed) location within a receiving area that determines position of one or more transmitter equipped objects of interest 108B within a field of interest 104. Object of interest 108B is equipped with (or co-resident with) a scanning transmitter 250 having a transmission area 102B for broadcasting emissions 103, 105 according to an ordered scan pattern. Receiver 200B-1 is configured to: (i) detect the emissions 103, 105, and recognize the ordered scan pattern being emitted; (ii) determine synchronization information (i.e., information about a reference point or index incorporated in the ordered scan pattern or otherwise provided by the transmitter 250) using synchronizing mechanism 120B; and (iii) determine positional information (e.g., presence and/or position) of device 108B based upon information about a point (or points) of interest (e.g., peak amplitude, frequency change, phase change, etc.) in the emissions 103, 105 and the synchronization information. Techniques for determining synchronization information will be described in further detail below for a variety of example embodiments and with reference to FIGS. 4, 5 and 6A-6C. Techniques for determining positional information will be described in further detail below for a variety of example embodiments and with reference to FIGS. 7A-7C.

Synchronization information can include a correspondence between a reference point in space and timing (or other) information for an occurrence of an event (e.g., pulse, pause, cyclical restart, etc.) in the ordered scan pattern and/or a timestamp or other information indicating when such an event occurred at the reference point in space. Receiver 200B-1 determines positional information for device 108B based upon the ordered scan pattern emitted by transmitter 250 by comparing a signal as received by the receiver 200B-1 with the timing information for the occurrence of an event in the ordered scan pattern for the reference point in space. In an embodiment, synchronization information can be distributed on an AM sub-channel of the emission 103, 105. Other information can be broadcast on the AM sub-channel as well in embodiments, including for example, identifiers of the transmitter 250 (and hence the device 108B), identity of the user 110 operating the device 108B, commands from the user 110, combinations thereof, and combinations with synchronization information.

In an embodiment, additional receivers 200B-2, 200B-3 (and others not shown in FIG. 2B for clarity sake) can operate to "listen" for transmitter 250 (or transmitters of other devices not shown for clarity sake) to track presence, positions and movements of user 110 and other users within field of interest 104. Such embodiments can provide intelligent environments in which multiple device can be made aware of the users (or automatons equipped with transmitters analogous to transmitter 250) to facilitate intelligent control of systems or devices within the intelligent environment.

In one embodiment, receivers 200B-1, 200B-2 and 200B-3 implement a home control application, as described in further detail with reference to FIG. 3B below, however other intelligent control environments (e.g., factory floor, warehouse, sales floors, auto dealerships, rental car agencies, space stations, lunar and/or planetary or interplanetary based living environments, etc.) are enabled with straightforward implementation of the techniques described herein.

In one embodiment, transmitter 250 is incorporated with, or co-located with; a wearable device 108B-1 enabling receivers 200B to detect users 110 by simple proximity without further action. Some embodiments can provide ensuring that the transmitter 250 is aligned with the user (e.g., transmitter front always faces outward from the user, etc.) thereby enabling the transmitter to provide information about whether the user is facing the receiver (i.e., reference point and receiver being faced experience the sweeping point of interest of the ordered scan pattern at nearly contemporaneous times).

In one embodiment, device 108B, 108B-1 is co-located, or embedded within, or otherwise couple-able with a Machine Sensory Control System (MSCS) such as described below with reference of FIGS. 8, 9, enabling users 110 to control device 108B, 108B-1, and/or transmit command information to other devices (not shown in FIG. 1B for clarity sake) coupled with receivers 200B using transmitter 250. Some embodiments can provide the capability for users to choose which device to direct commands based at least in part upon a direction that the user is facing, by determining at each receiver 200B whether the user 110 is facing that receiver by sensing the emissions 103, 105 of the device 108B. Some embodiments provide control from a MSCS incorporated with, or co-located with; a wearable device 108B-1. Some embodiments include implant of the MSCS into an animal enabling the family pet to control items (water, food dish, cat door) within the area 104B. In alternative embodiments, one or more devices coupled with receivers 200B includes an MSCS in the device, and the device determines whether to respond to input from its MSCS based in part upon the sensed position (and/or facing direction) of the device 108B (and hence user 110).

Figure 2A:
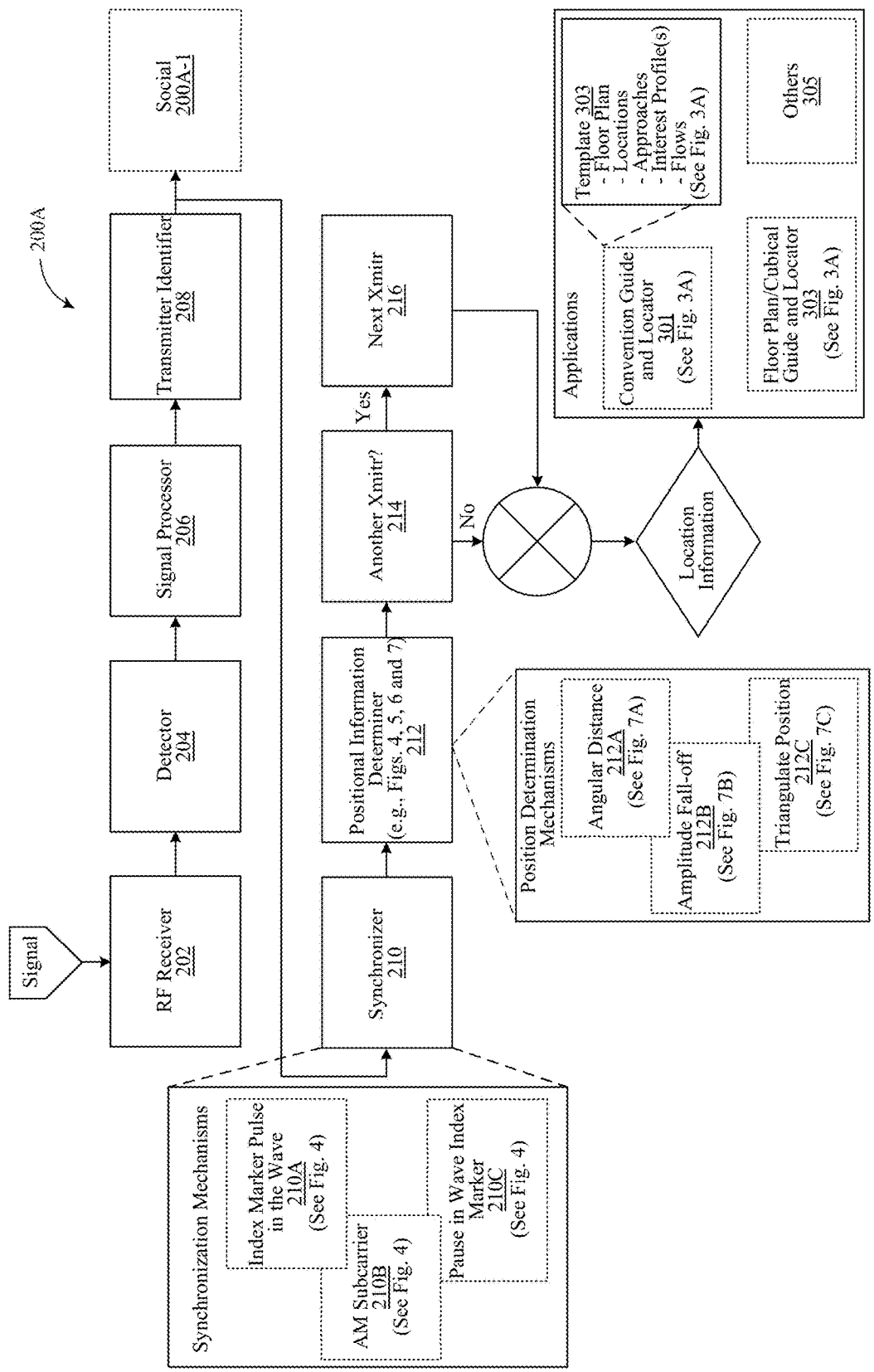
FIGS. 2A-2B illustrate simplified block diagrams of receiver embodiments that determine and use positional information according to embodiments.

FIG. 2A illustrates a simplified block diagram of a receiver embodiment that determines and uses positional information according to embodiments. As shown in FIG. 2A, an example receiver 200A associated with object of interest 108A includes integral and non-integral components of an RF receiver 202 that receives the emission. A detector 204 operatively connected to RF receiver 202 can identify signal(s) within the emission. In one embodiment, detector 204 detects the intensities of the received emission(s) at the object of interest, however, other salient feature(s) of the emission used to form a time varying signal can be detected as well. Other salient properties of the received emission that can also form a signal include, for example phase, intensity, amplitude, frequency, polarization, or combinations thereof. The component frequencies in this signal can be isolated by a signal processor 206 to facilitate the extraction of relevant information from the time varying signal. In one embodiment, signal processor 206 employs a Fourier transform (hardware or software) to separate the signal into component frequencies facilitating extraction of information from the signal; in other embodiments, one or more frequency filters, frequency-domain transforms, or any combinations thereof may be used. In one embodiment a transmitter identifier 208 identifies the emitter that transmitted the emission based upon component frequencies or other relevant property(ies) of the signal (e.g., frequency and time or combinations thereof of maximum amplitude of intensity of the signal, wavelength, polarization, phase, or other of several properties of the signal over time) and/or identification information encoded within the signal). A synchronizer 210 derives synchronization information based upon time (or other information) encoded within the ordered scan pattern using one or more techniques including index marker pulse 210A, AM subcarrier 210B and/or pause in wave index marker 210C, described in further detail with reference to FIG. 4 below. Positional information determiner 212 determines positional information for the receiver (and by implication or deduction an associated object of interest), using timing information of arrival of a point of interest (e.g. peak, etc.) in the emission (or other property(ies) of a signal received along with the emission) and the synchronization information determined by the synchronizer 210 using one or more techniques including angular distance 212A, described with reference to FIG. 7A below; amplitude fall-off 212B, described with reference to FIG. 7B below; and/or triangulation 212C, described with reference to FIG. 7C below. Positional information can include location, depth, orientation and other physical attributes of the object of interest in the field of interest. In an embodiment, social component 200A-1 provides ability for users of receiver 200A (and other like receivers) to share position information with one another. In such embodiments, one user who has determined a position precisely can provide reference point to a second user, which the second user can use to determine relative position based on perceived differences in the emission between the two users, which perceptions the users can share using social component 200A-1.

In an embodiment and by way of example, a point of time that a particular property of the received signal (e.g., peak amplitude, or a specific amplitude modulated signal) occurs can be compared with synchronization information about the ordered scan pattern to derive positional information. In one embodiment, the synchronization information can comprise a distinctive pulse pattern such that one or more pulses have a different amplitude modulated signal; in such an embodiment knowledge of which, if any, amplitude modulation corresponds to which pulse may be sufficient to derive positional information about the object of interest. Order information may comprise an interval of no emission at the beginning and/or end of each ordered scan pattern. In an embodiment, the ordered scan pattern comprises a correspondence between a property of the sum emission with a given angle to the field of interest and points in time.

In an embodiment, positional information from a plurality of sources can be acquired and used to determine location information of the receiver 200A in space as indicated by processing 214-216 of FIG. 2A, or from multiple such processes performed simultaneously, or any combination thereof. In an embodiment positional information from a variety of sources can be derived using triangulation 212C or equivalent techniques. In an embodiment, multiple receivers 200 can be placed at different positions on or relative to an object of interest and used to determine positional information about the object of interest, including deformation, velocity, and angular momentum, among other positional information.

In an embodiment, location information can be used in conjunction with one or more applications, which may be implemented co-resident with receiver 200A, or associated object of interest 108A. For example, a convention guide and locator 301 application, as described in further detail with reference to FIG. 3A below, can employ a template 303, either incorporated into, co-resident with, or in an associated object 108A, receiver 200A to provide position based guidance, location and approach determination, flow control of attendees and so forth in a convention or other large indoor or outdoor agglomeration of displays or attractions. Template 303 can further include floor plan(s), location(s) of attractions, landmarks or other points of interest, approaches (i.e., a preferred or desired direction to approach an of attractions, landmark or other points of interest), interest profile(s) for users of object 108A, and flows (i.e., courses to navigate through location(s) of attractions, landmarks or other points of interest). A floor plan guide/cubical locator 303 application can employ similar template 303 to provide guidance to persons or office sites within a large office environment. Further, user of receiver 200A and like receivers can employ social component 200A-1 to share information about the area (e.g., office, convention floor, warehouse, densely occupied cityscape, etc.) to aid one another in navigating the area, as illustrated in FIG. 3A and discussed in further detail below.

Figure 2B:
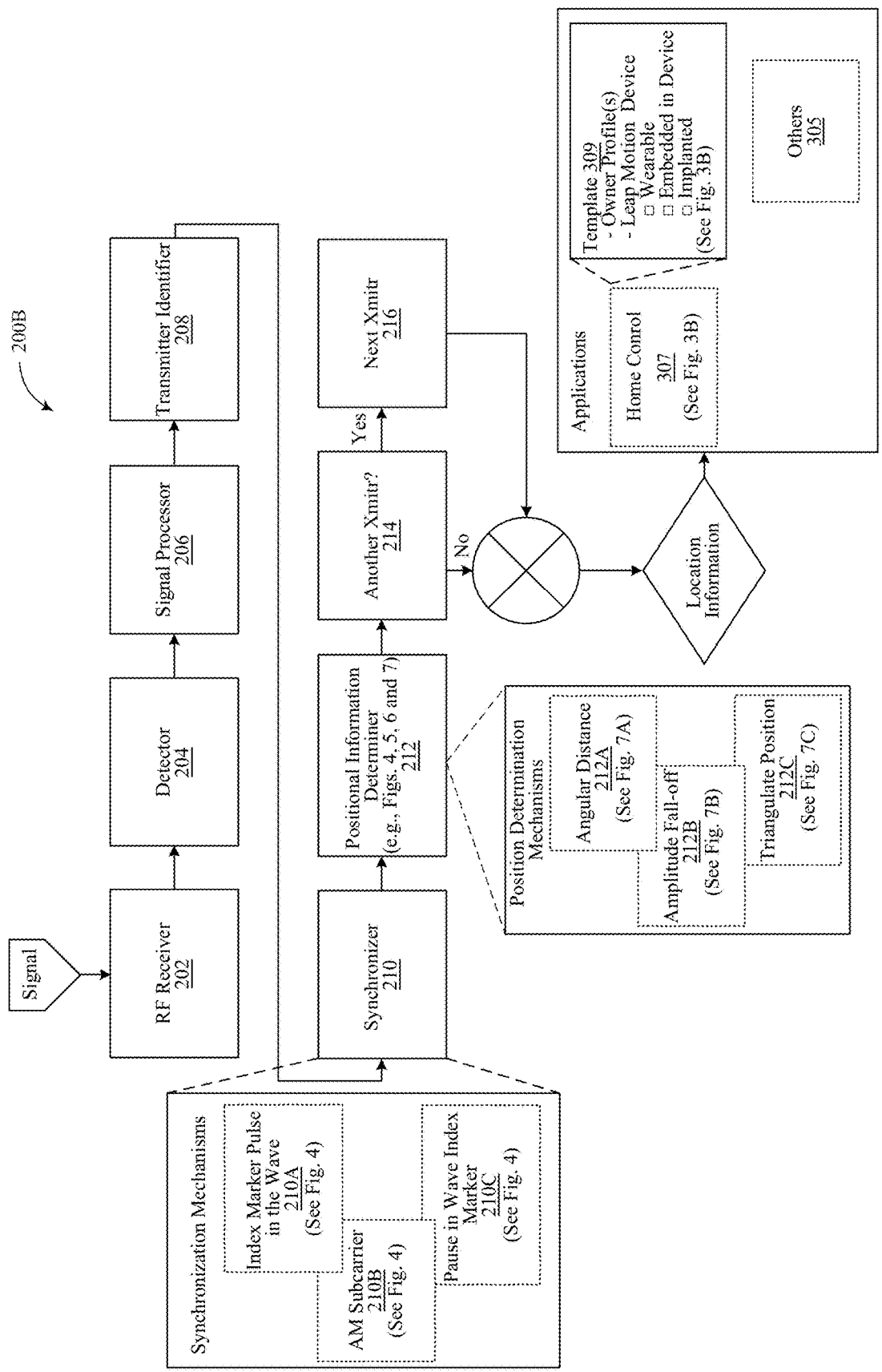

FIG. 2B illustrates a simplified block diagram of another receiver embodiment that determines and uses positional information according to embodiments. As shown in FIG. 2B, receiver 200B includes many similar components to receiver 200A of FIG. 2A. Receiver 200B is, however, adapted to be useful in conjunction with a fixed (or semi-fixed) location that determines position of one or more objects of interest 108B equipped with scanning transmitters or beacons. In one embodiment, receiver 200B implements a home control 307 application, as described in further detail with reference to FIG. 3B below, in which a template 309 enables receiver 200B to provide position based control, biometric aware location and identification.

Figure 3A:
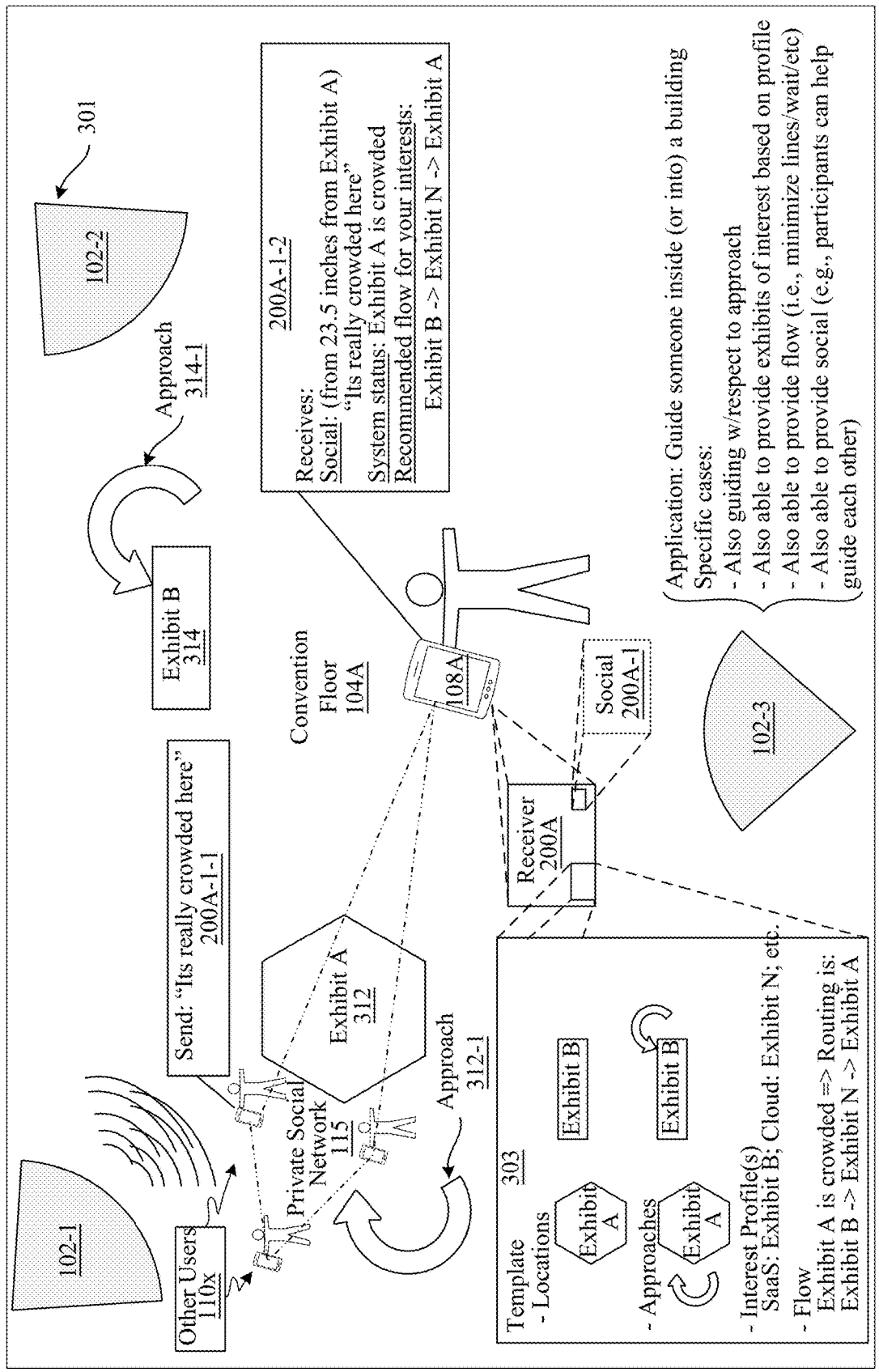
FIGS. 3A-3B illustrate exemplary use cases in which embodiments can be implemented.
Figure 3B:
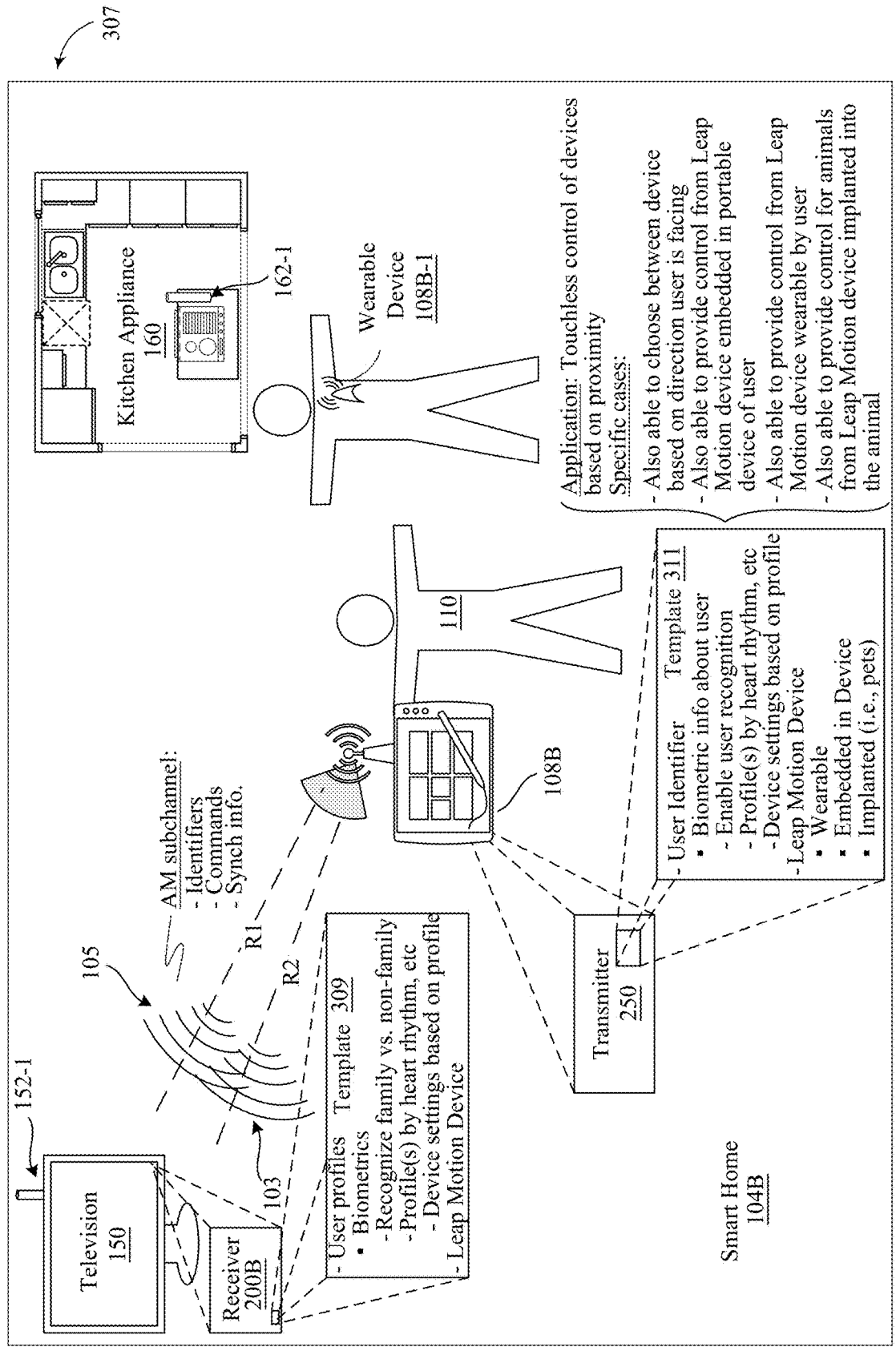

FIGS. 3A-3B illustrate exemplary use cases in which embodiments can be implemented. In an embodiment and by way of example, objects of interest can use and exchange positional (and other) information to coordinate behavior in a dynamic setting. For example, FIG. 3A illustrates a convention floor 104A in which users 110 of objects of interest 108A are able to obtain positional information from emitters 102 and each other, determine guidance information including locations and approaches to exhibits 312, 314 that are determined to be of interest to the users. Users can further communicate this and other information to each other, to a centralized receiver (not shown in FIG. 3A for clarity sake), or any combination thereof.

Receiver 200A includes a template 303 which may be (pre-) loaded onto device 108A in preparation for the event, downloaded by device 108A during the event, or combinations thereof. As receiver 200A determines its position relative to transmission areas 102-1, 102-2, 102-3 (and possibly others not shown for clarity sake), device 108A uses the positional information from the receiver 200A, the information of template 303, and information from social media component 200A-1 to provide a variety of information useful to the user of device 108A. In one embodiment, template 303 includes location information of exhibits (e.g., floor plan) as well as contents of the exhibits. Template 303 can include approach information for the exhibits, providing the user with an optimal approach to the exhibit, enabling greater convenience, improved viewing experience, or the like. Template 303 can include interest profile information for the user of device 108A, enabling the device to suggest nearby exhibits that would be of interest to the user. Template 303 can include flow information enabling the device 108A to conduct guiding the user to exhibits of interest to the user according to a flow in order to reduce overall wait time, control congestion at popular exhibits, and improve the user's overall experience.

A social media component 200A-1 coupled with receiver 200A enables device 108A to exchange information with other users 110x; forming a private social network 115. Users 110x can use private social network 115 to exchange information about points of interest (e.g., crowd conditions, directions, and other present sense impression information) with one another to enable dynamic coordination of behavior within convention floor 104A. For example, in an embodiment, one user sends message 200A-1-1 "it's really crowded here" to the social network 115. The message can be distributed to other uses on the social network, whose devices 108A receive the message as a social media update (e.g., 200A-1-2). In some embodiments, update 200A-1-2 can include status information (e.g., density of crowds (or line wait times) at the next intended exhibit, recommended exhibits of interest for the user, recommended flow, locations, approaches 312-1, 314-1 to avoid crowds or maximize experience, etc.).

An application can track an attendee's location throughout the event, keeping a record of the user's path. The record can enable users, for example attendees of a conference, to open an app on the device and see where (e.g., at what exhibits) they spent their time. In some implementations, the user can access saved content (e.g. documents, videos, etc.) posted by the conference exhibitors based upon the exhibits visited during the day and recorded in the device and/or at a centralized server accessible to devices. Similarly, exhibitors can be provided identities of those who visited their booths, subject to attendee approval, to direct follow-up efforts accordingly.

Some embodiments can provide guidance inside of (or into) a building (i.e., find my cubical in the BIG CO. campus). In an embodiment, guidance information can include approach (e.g., through the door on the left). Some embodiments can provide information about exhibits of interest based upon profile information specific to the device user and presented according to position of the device 108A (and hence the user) (e.g., show hot dog stands when the user approaches the food court, knowing the user's diet requires hot dogs). Some embodiments can provide flow information (e.g., which exhibits in the user's area have lowest wait times, shortest lines, etc.). Some embodiments can provide the ability for users to guide one another using social media.

While described with reference to one embodiment conducting guidance in a convention floor setting, other dynamic positioning environments (e.g., factory floor, warehouse, sales floors, auto dealerships, rental car agencies, space stations, lunar and/or planetary or interplanetary based living environments, etc.) are enabled with straightforward implementation of the techniques described herein.

FIG. 3B illustrates an intelligent area control environment 104B in which one or more receivers are embedded into (or coupled with) fixed (or semi-fixed) appliances or electronic devices and adapted to determine position of one or more transmitter equipped objects of interest 108B moving within the environment 104B. For example, television 150, equipped with receiver 152-1, determines positional information of device 108B belonging to user 110. Positional information about device 108B enables television 150 to decide whether commands (or other information) provided by user 110 using device 108B are directed at (or intended for) television 150, and thereby determine whether to respond to the commands or other information.

Receiver 152-1 can include a template 309 including biometric information (e.g., heart rhythms, vein and/or artery patterns, fingerprints, etc.) for users 110. Accordingly some embodiments can compare biometric information sent by device 108B with biometric information for known users stored within template 309 to recognize whether the user is a family member, guest or intruder. Age information in the profile can be used to control access to programming or functionality by device 150.

In one embodiment, device 108B, 108B-1 is co-located, or embedded within, or otherwise couple able with a Machine Sensory and Control System (MSCS) such as described below with reference of FIGS. 8, 9, enabling users 110 to control device 108B, 108B-1, and/or transmit command information to devices 150, 160 using transmitter 250. Some embodiments can provide the capability for users to choose which device to direct commands based at least in part upon a direction that the user is facing, by determining at each receiver whether the user 110 is facing that receiver by sensing the emissions 103, 105 of the device 108B. Some embodiments provide control from a MSCS incorporated with, or co-located with; a wearable device 108B-1. Some embodiments include implant of the MSCS into an animal enabling the family pet to control items (water, food dish, cat door) within the area 104B. Alternatively, one or more devices coupled with receivers 200B includes an MSCS in the device, and the device determines whether to respond to input from its MSCS based in part upon the sensed position (and/or facing direction) of the device 108B (and hence user 110).

Figure 4:
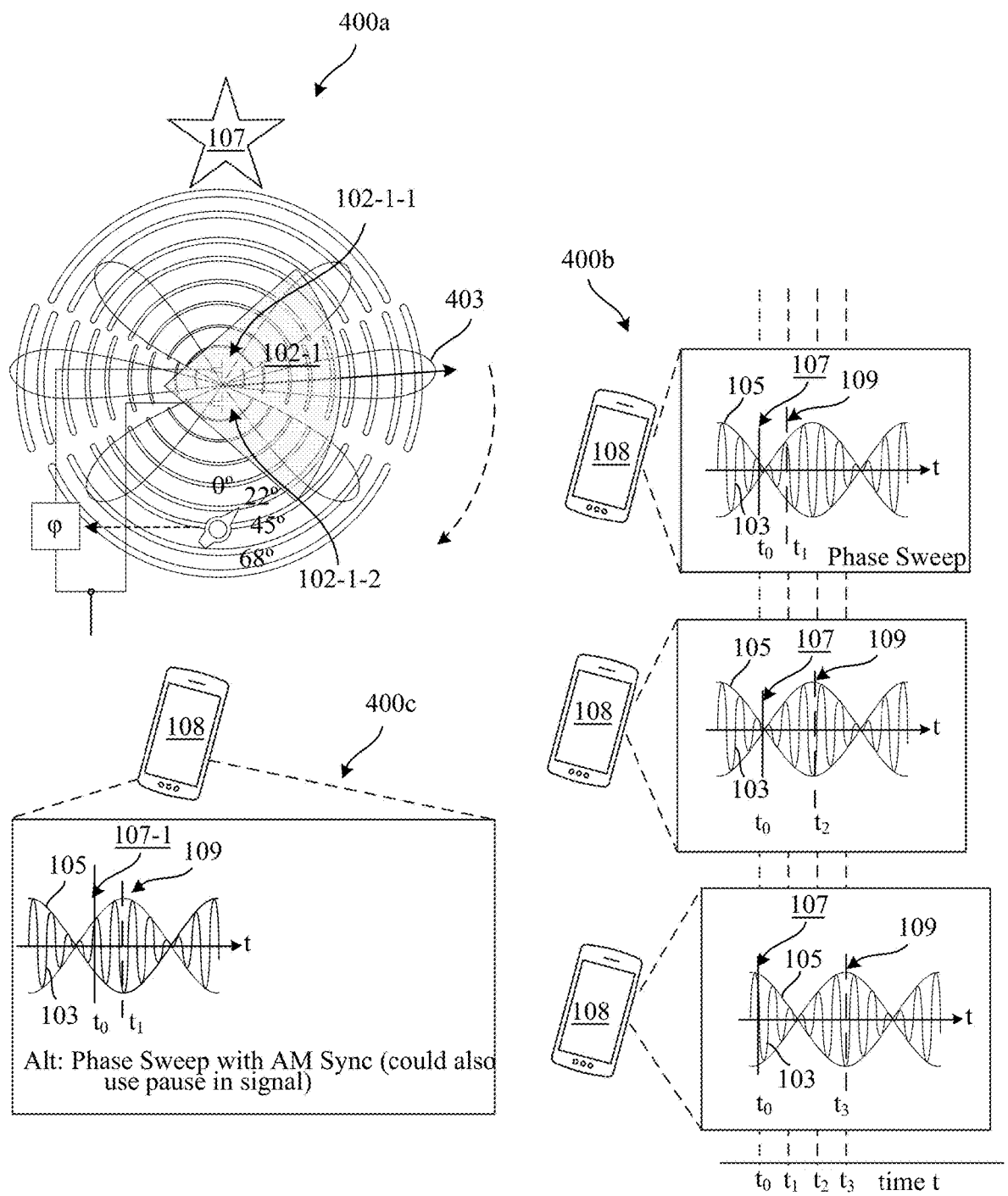
FIG. 4 illustrates emitting elements emitting an ordered scan pattern and a receiver determining positional information using the ordered scan pattern according to an embodiment.

FIG. 4 illustrates emitting elements emitting an ordered scan pattern and a receiver determining positional information using the ordered scan pattern according to an embodiment. As shown by FIG. 4, a transmission area 400a comprises an array 102-1 of emitting elements, which can be emitting elements 102-1-1, 102-1-2 of FIG. 1A for example. In transmission area 400a, a sweeping sum emission is formed by continuously altering the phase of the plurality of emitting elements in the transmission area, which is sometimes referred to as "beam forming." Phased array 102-1 is comprised of a dipole arrangement of emitting elements within a feed horn, but can take a linear shape, or it can have any of numerous planar configurations such as a square, a diamond, a grid, a circle, alternating bands, clusters or combinations of such shapes, or other configurations. In one embodiment more than one transmission area can be arranged in the shape of a collection of non-coplanar emitting elements. Emitting elements 102-1-1, 102-1-2 can transmit the emission directly onto the field of interest 104, such that the emission combines to form sum emission. Sum emission is an emission that is the product of a plurality of emissions. In one embodiment, two or more emitting elements in the transmission area transmit the emission with a difference in phase to form a sum emission with a specific beam angle. In an embodiment, a mechanism varies the phase between the emitting elements to achieve a predictable variation in the angle of a sum emission comprising emission emitted from emitting elements 102-1-1, 102-1-2 as a function of time. In an embodiment, emitting elements 102-1-1, 102-1-2 in the emission area 102-1 are pulsed at different frequencies to form a sum emission(s) comprising a beat frequency; this sum frequency (or frequencies) is used to iterate smoothly over phase angles between the emitting elements 102-1-1, 102-1-2, to form a scanned beam 403 that sweeps over the field of interest 400b. In an embodiment, the scan 403 comprises a continuous variation of the angle of the sum emission relative to a reference point chosen within the transmission area. Pulsing of an emitting elements 102-1-1, 102-1-2 in the transmission area 102-1 can be continuous, discrete, or the product of a digital process, for example a digital oscillator and a digital-to-analog converter, or any combination thereof.

Again with reference to FIG. 4, a field of interest 400b includes a device 108 (with receiver 200 not separately shown for clarity) shown at a plurality of angular positions relative to transmission area 400a. Emissions are received at the device 108 as a signal of amplitude (or other property) over time; further, an embedded clock-pulse in the emissions conveys information about the timing of the ordered scan pattern which the device 108 uses to infer its angle relative to a reference point (e.g., due north, 12:00 position, 90 degrees relative to due north, etc.) in the field of interest. As shown in FIG. 4, device 108 perceives differences in the received emission at different times of the ordered scan pattern depending upon the angular position of device 108 in field of interest 400b. Device 108 can determine from the emission an occurrence of a point of interest within the ordered scan pattern occurring at a corresponding occurrence time for the point of interest. In FIG. 4, device 108 perceives a point of interest 109 (such point may comprise a peak in amplitude, but could be any identifiable point in any time varying property of the received signal) at a time $t_1$ in a first position, a time $t_2$ in a second position and a time $t_3$ in a third position. Device 108 can determine synchronization information 107 (from the signal, a different signal, or other source). Synchronization information 107 can comprise any type of information indicating a reference point from which device 108 can use to determine its position based upon differences perceived in the signal by device 108 and the reference point. In one embodiment, synchronization information 107 indicates a time of occurrence of the point of interest within the ordered scan pattern as would be experienced at a reference point (actual or hypothetical). Device 108 can determine positional information from the synchronization information and the occurrence time for the point of interest. In one embodiment, the difference in time between the known start of an angular scan pattern and the detection of maximum amplitude of a received signal correspond to the positional information about the device 108, and hence the object of interest (not shown for clarity) proximate to device 108. Further, if the device 108 has synchronization information (or receives information) that includes information about the source of the signal indicating a spatial position from where the reference point is measured and an angular velocity ($\omega$) of the scan 403, the receiver can determine a distance in space from the reference point for which the synchronization information. The foregoing example describes one embodiment of determining positional information at a device 108 equipped with a receiver to receive scan 403. One skilled in the art will appreciate the many alternatives evident in view of the foregoing description.

In embodiments, one or more synchronization mechanisms can be employed to determine information about the timing of the ordered scan pattern and the properties of the signal. For example, timing information can be conveyed as an amplitude modulation of an emission. In one embodiment, as indicated by 400c in FIG. 4, a "clock-pulse" 107-1 is encoded as an amplitude modulation of an emission of emission from the transmission area which corresponds to a given time in the ordered scan pattern. If the amplitude of received emission forms a signal over time at the object of interest, the clock pulse can form a distinctive feature of this signal from which information about the ordered scan pattern can be derived. Subsequently, comparing the time of the clock-pulse in the signal to the time of maximum amplitude in the signal can position the object in the area of interest relative to the angles of emission in the ordered scan pattern. In other embodiments, such information about the ordered scan pattern is encoded and transmitted separately to the object of interest, for example via a Wi-Fi signal, via a light pulse, via a periodic audible sound or other electromagnetic or sonic radiation. In one embodiment the device 108 includes an internal clock or clocks that is capable of synchronizing to some aspect of the timing of one or more ordered scan patterns. For example, the object of interest may receive a timed pulse from the transmission area such that the travel time of the timed pulse is substantially identical to the travel time of the emission. The object of interest can alter the timing of one or more of its clocks so that they pulse at the same frequency and phase as the received timed pulse. Thus, the object of interest may be synchronized to the scan pattern of a transmission area, and positional information from the signal formed by the received emission can be derived as described above.

Figure 7A:
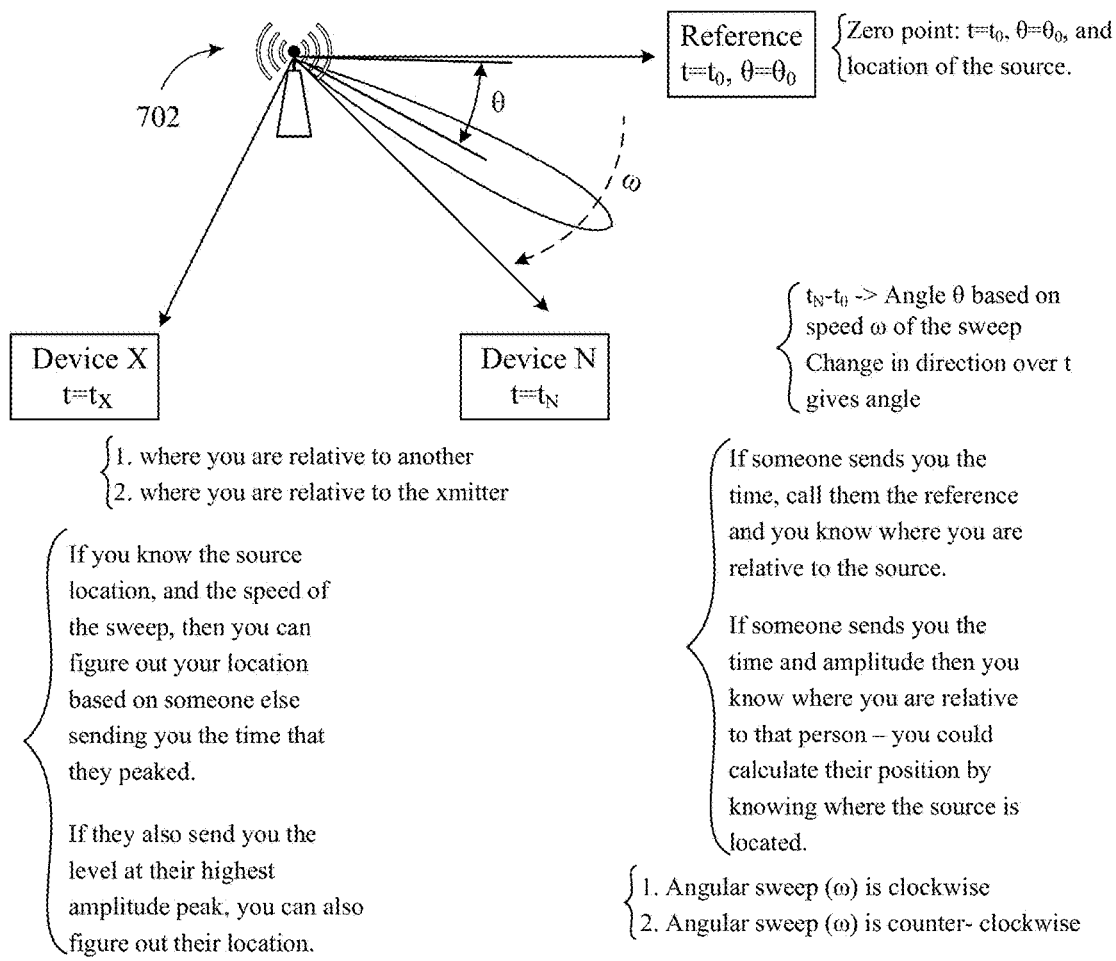
Figure 7C:
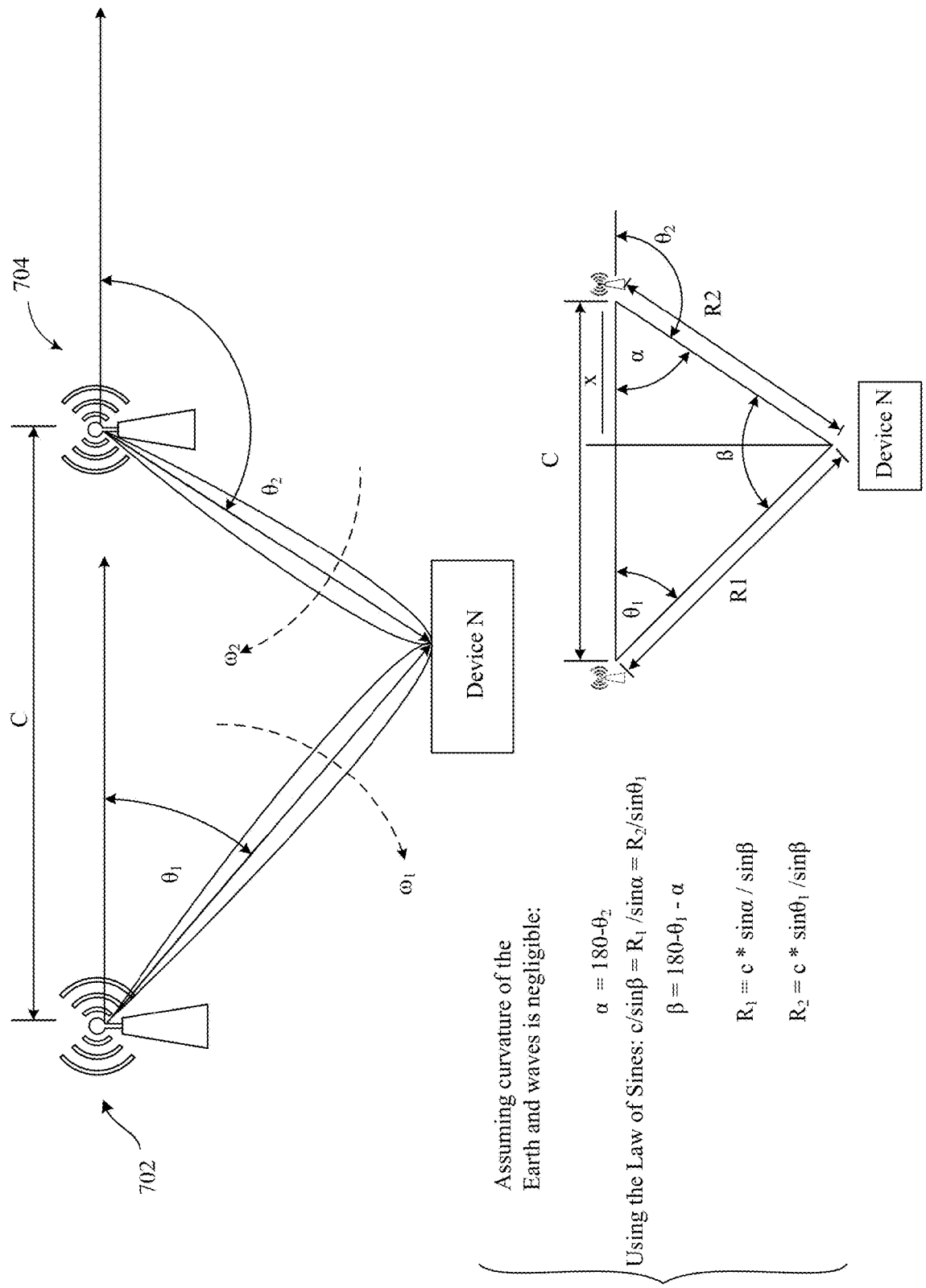

There are several possible ways to extract positional information about the object of interest by analyzing the correspondence between information about the ordered scan pattern and a property of the received signal. FIGS. 7A-7C illustrate various position determination techniques that might be employed in accordance with some embodiments. In an embodiment, the time between a clock-pulse 107 and a property of the received signal, for example but not limited to a peak of amplitude in the signal 109, corresponds to the object of interest's location in the field of interest; the time between the clock-pulse and the amplitude peak is proportional to the angular position of the object relative to the transmission area. In one embodiment this relationship is proportional to the angular velocity ($\omega$) of the scan 403.

Figure 5:
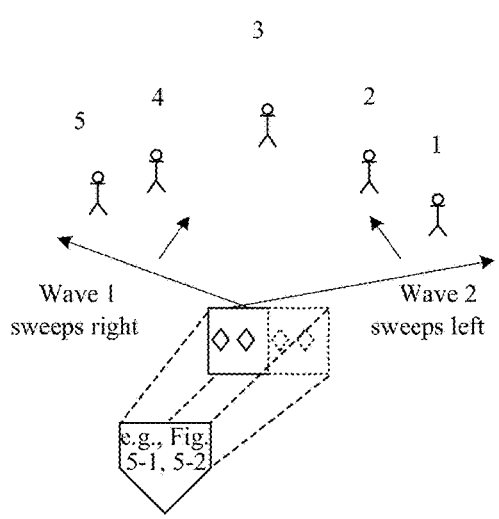
FIG. 5 illustrates a plurality of distinctive sum emissions being received at an object of interest in according to an embodiment.
Figure 5:
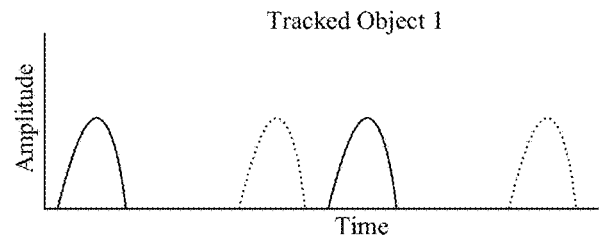
Figure 5:
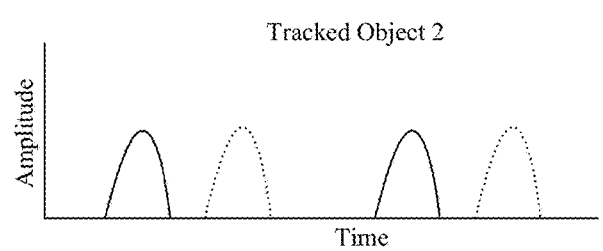
Figure 5:
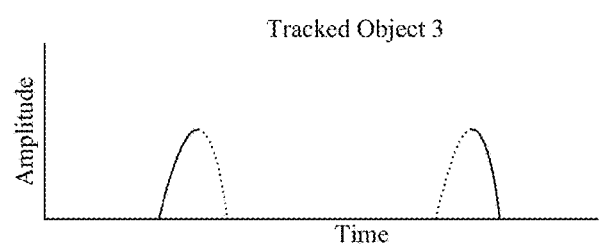
Figure 5:
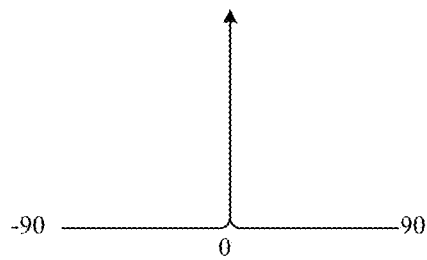
Figure 5:
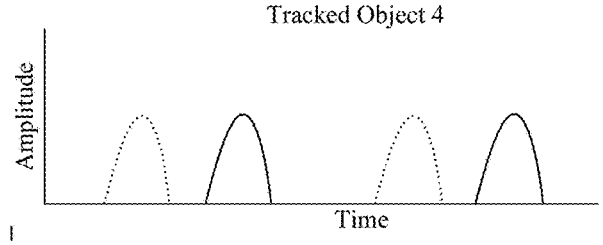
Figure 5:
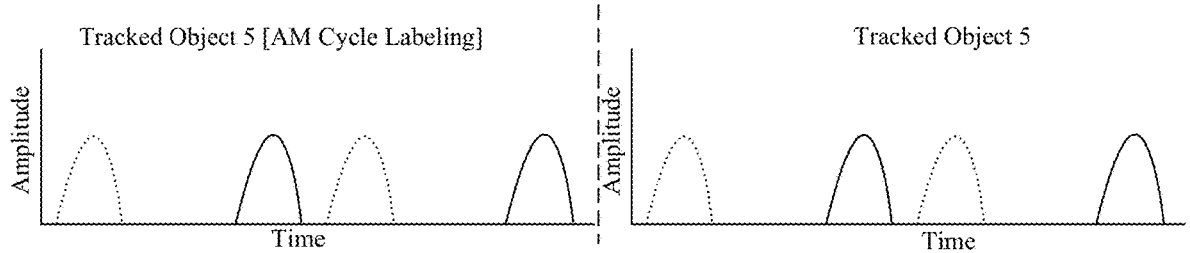
Figures 1, 5:
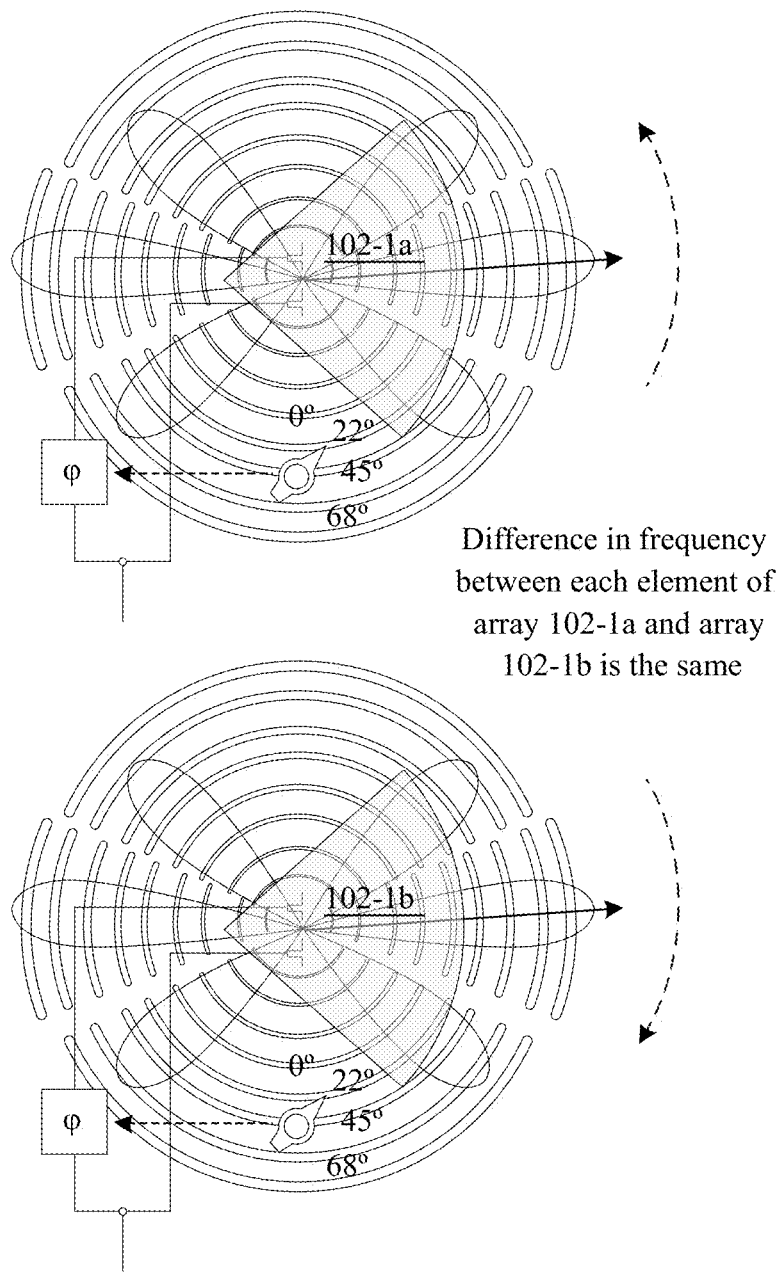

In an embodiment, the synchronization method may take the form of a correspondence between two properties of the received signal. For example, in a received signal of amplitude varying over time, the timing information can be derived by comparing the maximum amplitudes of the composite signal. In one embodiment, amplitude modulation can be used to resolve ambiguity in determining timing information. FIG. 5 illustrates a plurality of distinctive sum emissions being received at an object of interest according to an embodiment. As illustrated in FIG. 5, an embodiment in which the transmission area transmits an emission comprising an ordered scan-pattern such that two sum emissions "sweep" the field of interest from opposite directions, for example as illustrated in FIG. 5-1. These sum emissions may vary in one of various distinctive properties, for example carrier frequency, phase, polarization, or any combination thereof of emissions can form sum emission with a specific property. In one embodiment, the difference between the maximum amplitudes of the received signal derived from the intensity of the sum emissions is proportionally related to the angle the object makes with the transmission area. In one embodiment, a "label" or other identifier is associated with each alternating cycle of an ordered scan pattern to facilitate the disambiguation of the received signal, for example by encoding an amplitude-modulated signal in each alternating cycle.

Figures 2, 5:
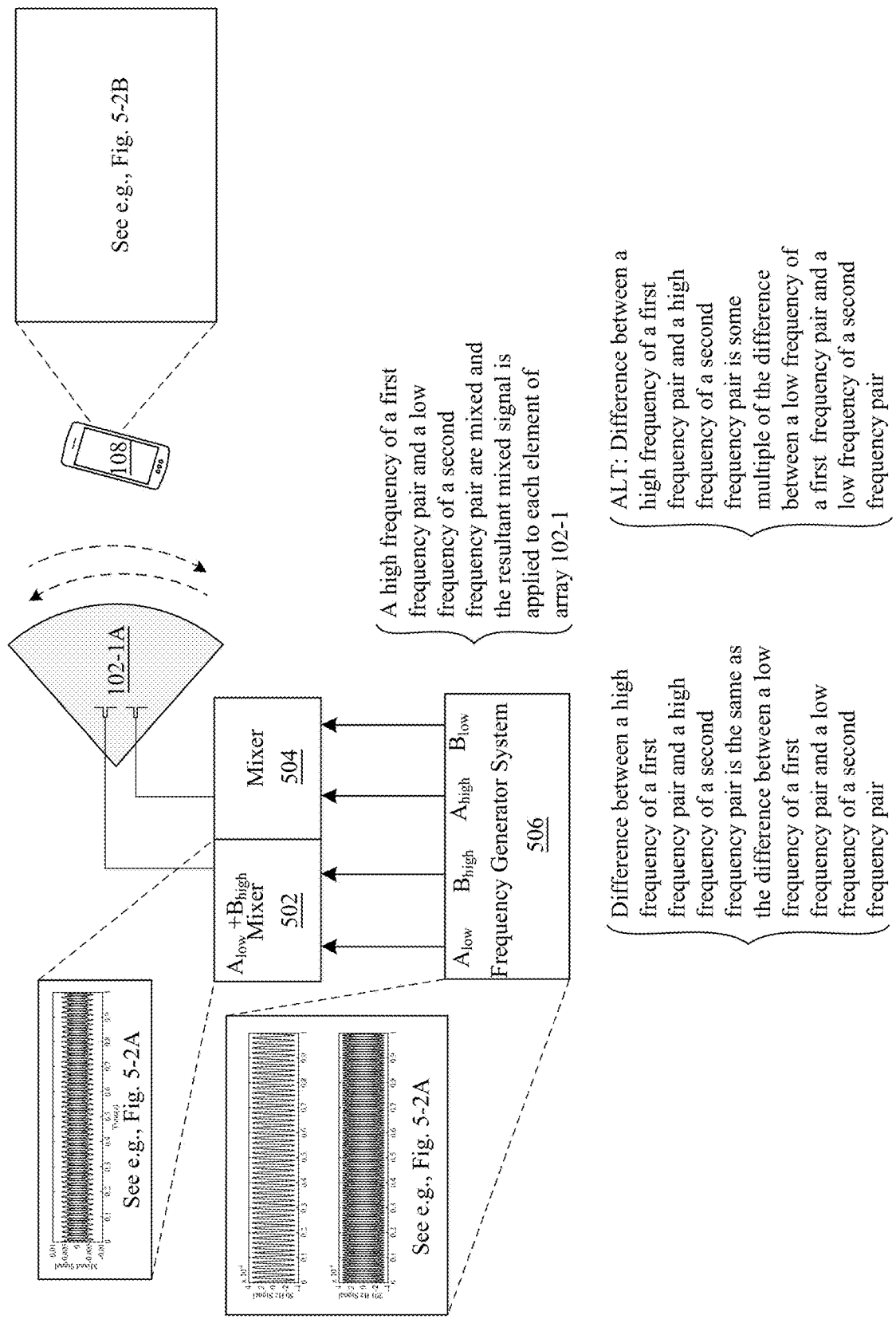
Figures 2A, 5:
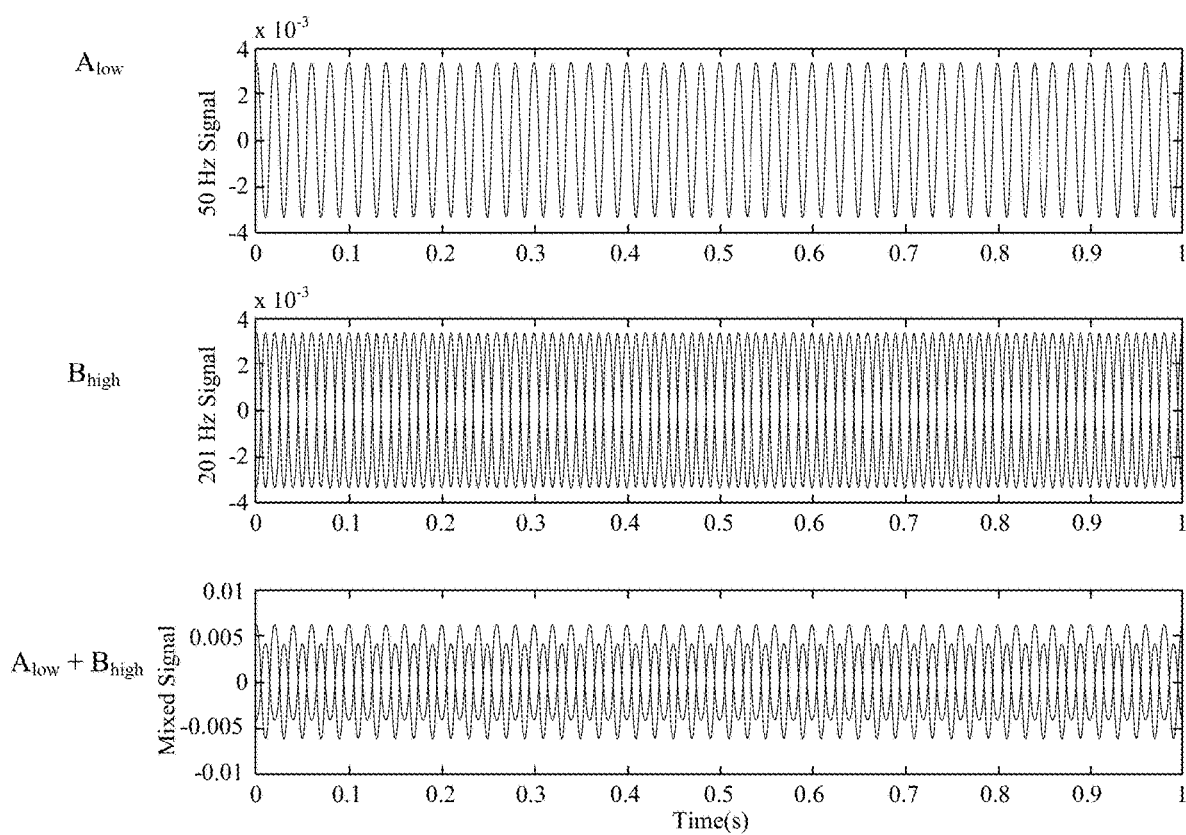
Figures 2B, 5:
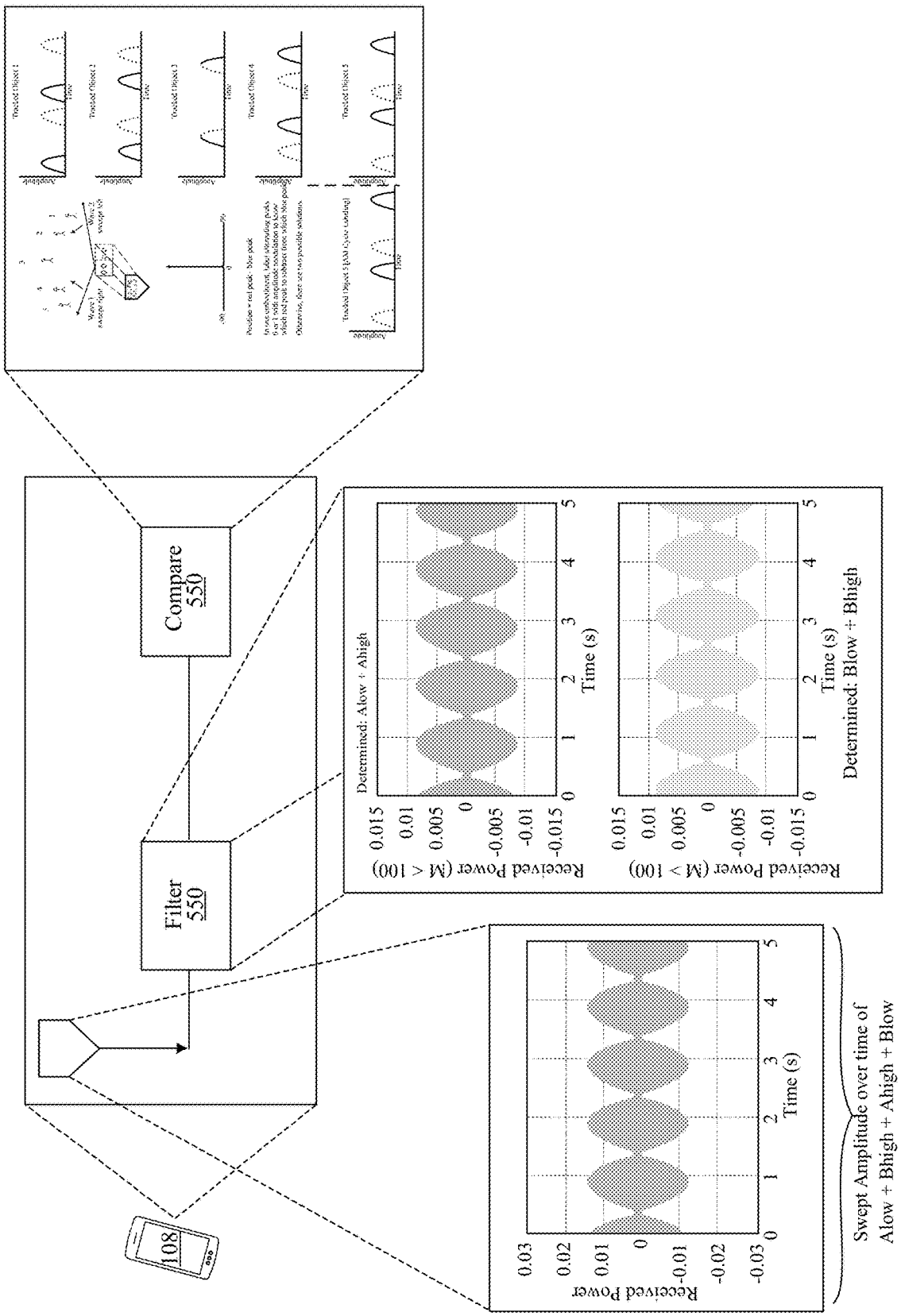

FIG. 5-2 illustrates an alternative embodiment of a process for producing scans that sweep the field of interest in opposite directions. A frequency generator 506 additively mixes low and high components of frequencies A 502 and B 504, and cross-feeds this mixed signal to two emitting elements in the transmission area. A detail of this mixing can be seen in FIG. 5-2a. FIG. 5-2b illustrates one embodiment of what this mixed sum emission looks like as a signal of intensity over time captured by the one or more receivers on an object of interest within the field of interest. In one embodiment, frequency filters are used to further disambiguate the received signal into two determined beat frequencies. Such filters can be implemented physically, in hardware, in software, or any combination thereof. In such an embodiment, positional information is extracted similarly to the methods and embodiments described in FIG. 5-2.

Figure 6A:
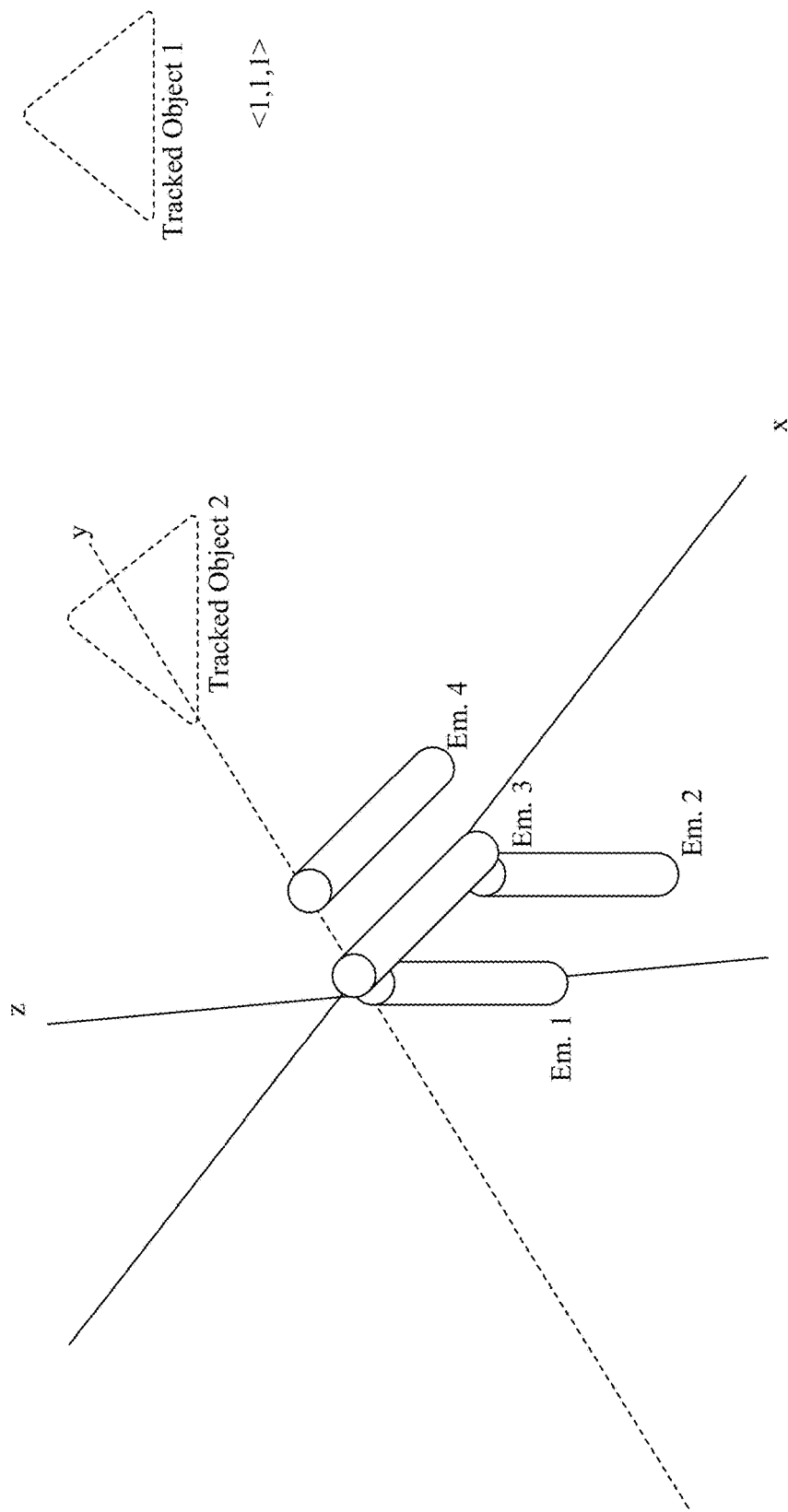
FIGS. 6A-6C illustrate operation of a transmission area embodiment in which constituents are non-coplanar.
Figure 6B:
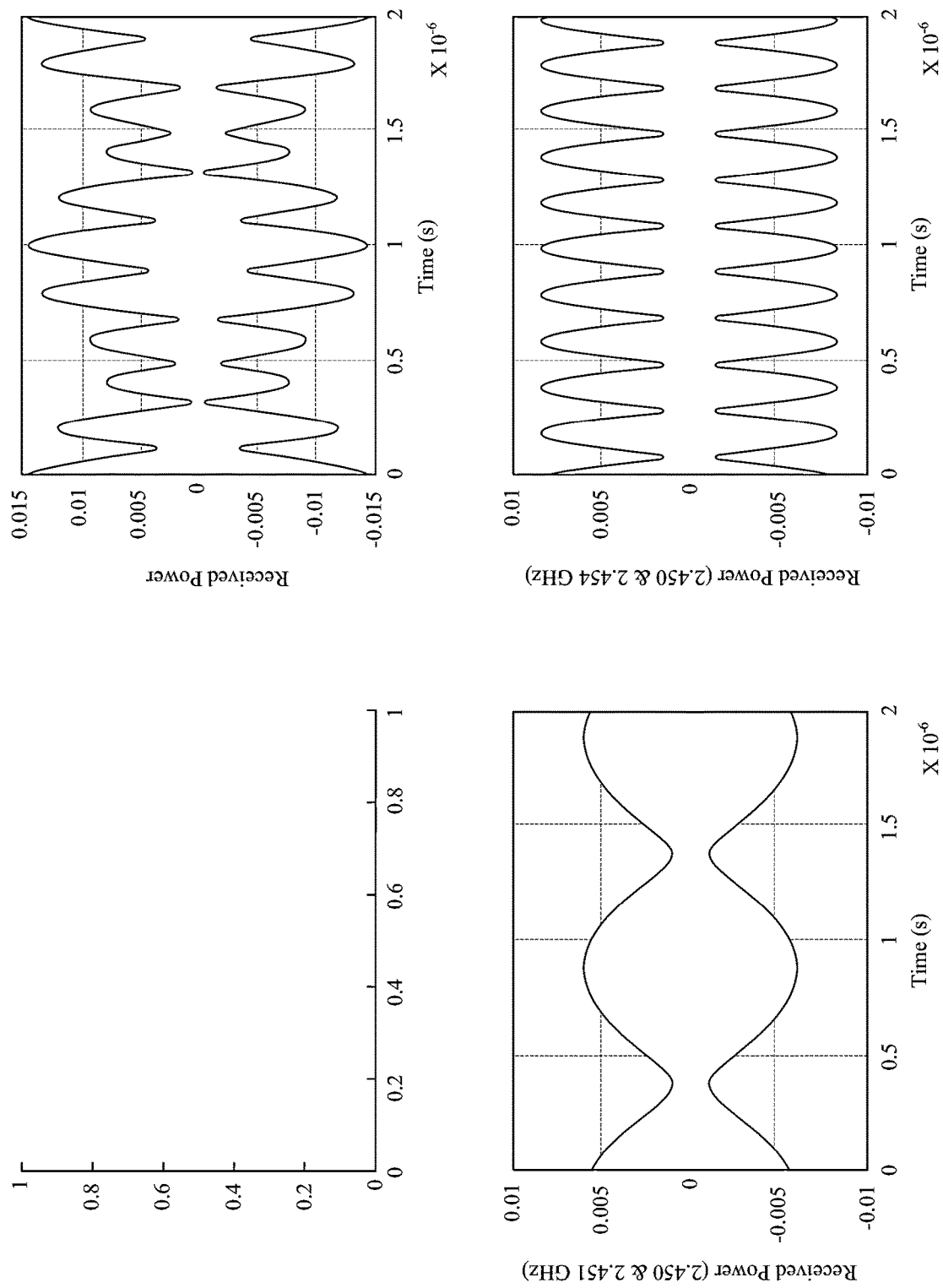
Figure 6C:
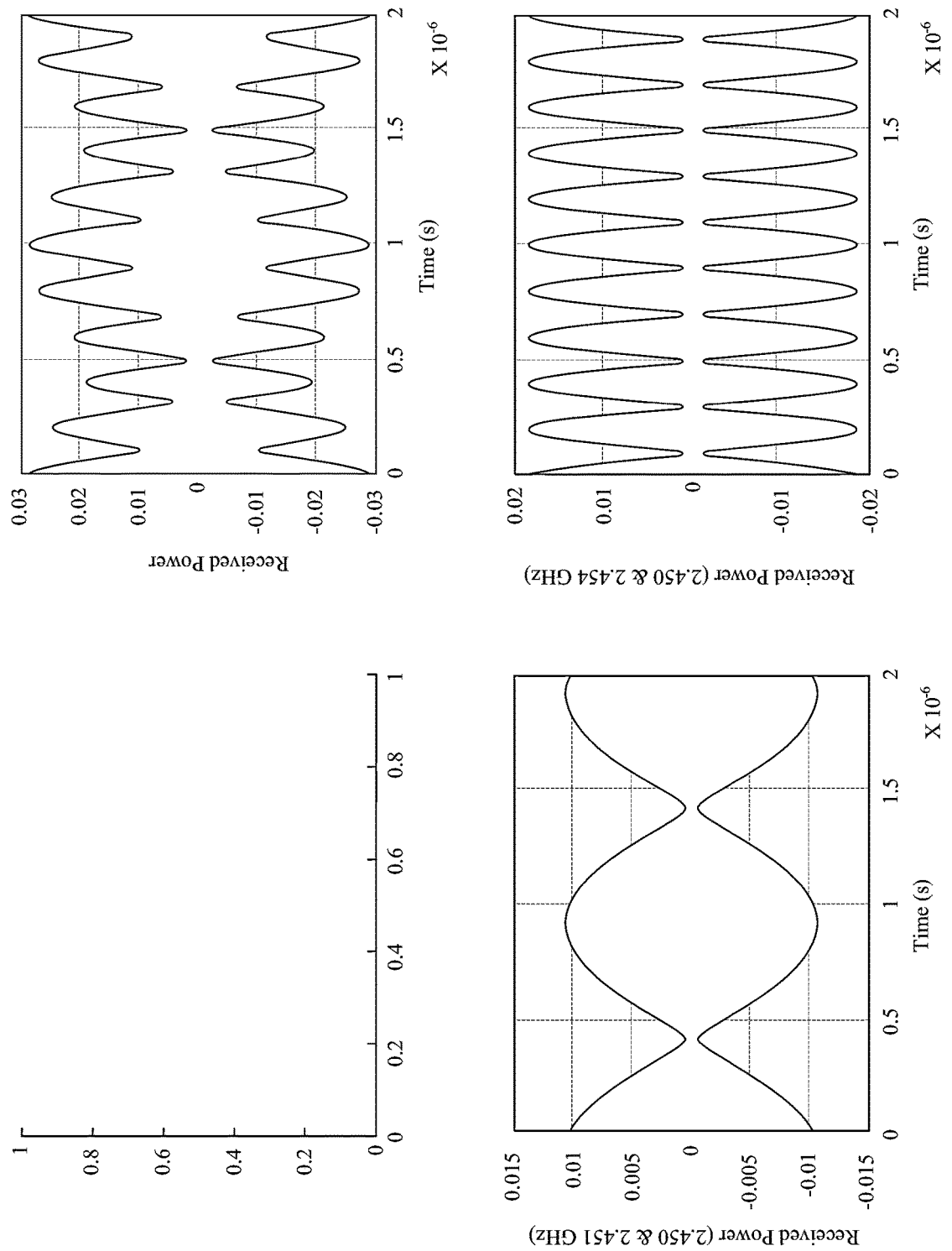

FIGS. 6A-6C illustrate operation of a transmission area embodiment in which constituents are non-coplanar. As shown in FIG. 6A, one embodiment of a transmission area comprises two pairs of emission lines that emit toroidal emission patterns; the emission patterns could comprise any shapes and are only limited by the geometry of the transmission area and its constituents.

FIG. 6B illustrates one possible configuration of the transmission described in FIG. 6A that transmits an emission intercepted by a receiver associated with the object of interest, which forms a signal of amplitude over time. FIG. 6B illustrates an embodiment where such a signal is decomposed into constituent parts, and positional information extracted from each part. In this embodiment, two angles relative to the origin of the transmission area are extracted from one received signal. In embodiments a band-pass filter can be used to extract the different frequencies, and common frequencies in sub-signals can be additively mixed back in proportion to the relative amplitude of the distinct frequencies.

FIGS. 7A-7C illustrate various position determination techniques that might be employed in accordance with some embodiments. Some embodiments can employ angular distance determination techniques, as shown in FIG. 7A, to determine positional information comprising an angular distance relative ($\theta$) to a reference point in space (e.g., a 3:00 position relative to station 702) using information from a reference point (e.g., position and time of another user, an index (pulse, pause, or other ordering), or a time stamp (or equivalent information) that can be encoded on an AM carrier of the emission, transmitted separately or otherwise conveyed to users in the vicinity of station 702. Users can determine (1) their position relative to one another; and/or (2) their position relative to the station 702. For example, if a user knows the source location (i.e., identifies station 702 and looks up its location in a database), and the speed of the sweep, the user can figure out the user's location based on someone else sending the user the time that they experienced the peak. If they also send you the level at their highest amplitude peak, you can also figure out their location.

If someone (at say the 3:00 position relative to the station 702) sends to a user the time that they experienced a peak, the user can call them the reference and determine where the user's position relative to the station. If someone sends to the user the time and amplitude when they experienced a peak, then the user can determine where the user is located relative to that person and could calculate their position by knowing where the source is located.

For example, and in one embodiment with reference to FIG. 7A, users in different angular positions around station 702 will experience the sweep at different times as compared to one another because the wave front sweeps around and around the station. Angular sweeps ($\omega$) can be clockwise or counter-clockwise. If a receiver knows the rate of travel ($\omega$) of the sweep for this station, and an angular position of the peak at an arbitrary reference point at time $t_0$, then the receiver experiencing the peak at time $t_N$ can determine its own angular position relative to the angular position of the reference point using the time difference and rate of travel ($\omega$) of the sweep:

$$\text{Angular distance from reference}(\theta) = \omega^*(t_N - t_0) \quad (1)$$

The arbitrary reference point is simply a point picked to be "zero" or "origin" from which measurements can be taken. It could be anywhere. For example, let's say that the arbitrary reference point is 3:00 relative to the center of the station. Then, $t_0$ is the time of occurrence of the "point of interest" (i.e., the peak of the sweep) as would be experienced at the reference point (or in other words, as someone sitting at 3:00 position relative to the station sees the sweep pass. There need not be a receiver at the reference point, the station could simply encode a time when the wave front is sent at the 3:00 position OR add a synch pulse (or pulses) to the wave front, (i.e., forming a "second point of interest") OR encode clock information onto an AM subcarrier, a different signal altogether, etc., (i.e., in which case no "second point of interest" is ever formed) OR use a combination of techniques to provide receivers with enough information to determine their position relative to some defined point in space. Irrespective of which of these techniques is used, each provides an equivalent to the information of how the time of occurrence of the point of interest within the ordered scan pattern as would be experienced at a reference point.

Some embodiments can employ amplitude fall-off techniques, as shown in FIG. 7B to determine positional information using two elements 102-1-1, 102-1-2 of a phased array comprising monopole radio antennae. The two elements of the array are spaced apart a distance (c). The first element emits a slightly higher frequency than the second element. In one embodiment, the frequency of the first element is exactly one Hz (one cycle per second) greater than the second element. The phase difference between the emissions of the two elements produces a beat frequency. The beat frequency is here defined as the sum wave of the frequencies of the first and second element. The object of interest enters, or is placed, within the field of interest.

FIG. 7B shows, a triangle is formed by the following points: the receiver 108, the first element of the transmitter, and the second element of the transmitter. The leg between the receiver 108 and the first element of the transmitter 102-1-1 is noted in the equations below as R1. The leg between the receiver 108 and the second element 102-1-2 is noted below as R2. The third leg is the distance between the elements (c). The receiver 108 receives the beat frequency from the transmitter elements 102-1-1, 102-1-2.

The receiver 108 extracts the two component frequencies from the received frequency. In one embodiment it does this by performing a Fourier transform. These are denoted "First Power Amplitude" and "Second Power Amplitude". As the transmission power of the elements of the transmitter, as well as their construction and distance, are known in advance, it is possible to compute R1 and R2 from the first and second Power Amplitudes using the law of cosines to find the angle between R1 and R2. This yields a circle in space as the positional information. This narrows the possible location of the receiver 108 to one point on a circle in three-dimensional space. Obtaining more positional information either in an analogous way using other transmitter elements or using other techniques described herein, or combinations thereof, is sufficient to determine the location of the object of interest. For example:

$P_0$ = transmission power of each element of phased array
$P_x$ = received power of tracked object in terms of amplitude of Fourier transform
$R_{1,2}$ = distance to elements of phased array transmitter 1,2

$$P_1 = \frac{P_0}{4\pi R_1^2}, P_2 = \frac{P_0}{4\pi R_2^2}$$

$$\text{So, } R_1^2 = \frac{P_0}{4\pi P_1}, R_2^2 = \frac{P_0}{4\pi P_2}$$

$$\text{So, } R_1 = \sqrt{\frac{P_0}{4\pi P_1}}, R_2 = \sqrt{\frac{P_0}{4\pi P_2}}$$

So the angle γ the tracked object forms between the two ends of the antenna is:

$$c^2 = a^2 + b^2 - 2ab \cos\gamma \text{ (by the law of cosines)}$$

$$\gamma = \arccos\left(\frac{a^2 + b^2 - c^2}{2ab}\right);$$

Accordingly, the angle the object of interest makes with the two elements of the phased array is determined. A set of possible locations providing the known angle defines a circle in three-dimensional space. Two such two-element phased array transmitters position the object within the intersection of two 3D circles. Accordingly, it is possible to determine the location of the object within two or one possible locations depending on the circle geometry.

Some embodiments can employ triangulation techniques, as shown in FIG. 7C to determine positional information including distances $R_1$, $R_2$ to stations 702, 704, comprising solving for the illustrated quantities as follows:

α=180−$θ_2$

Using the Law of Sines: $c$/sin β=$R_1$/sin α=$R_2$/sin $θ_1$

β=180−$θ_1$−α

$R_1$=$c$*sin α/sin β

$R_2$=$c$*sin $θ_1$/sin β

Other applications include entertainment settings, where the methods described herein replace the need for accelerometers or other sensory devices. For example, one entertainment setting includes a video gaming system. Implementations including multiple beacons (e.g., FIG. 7C) can reduce cross-talk interference by harmonics of transmitted frequencies by choosing the frequencies in use such that all frequencies are pairwise co-prime.

In one embodiment, a motion sensing and controller system provides for detecting that some variation(s) in one or more portions of interest of a user has occurred, for determining that an interaction with one or more machines corresponds to the variation(s), for determining if the interaction should occur, and, if so, for affecting the interaction. The Machine Sensory and Control System (MSCS) typically includes a portion detection system, a variation determination system, an interaction system and an application control system.

Figure 8:
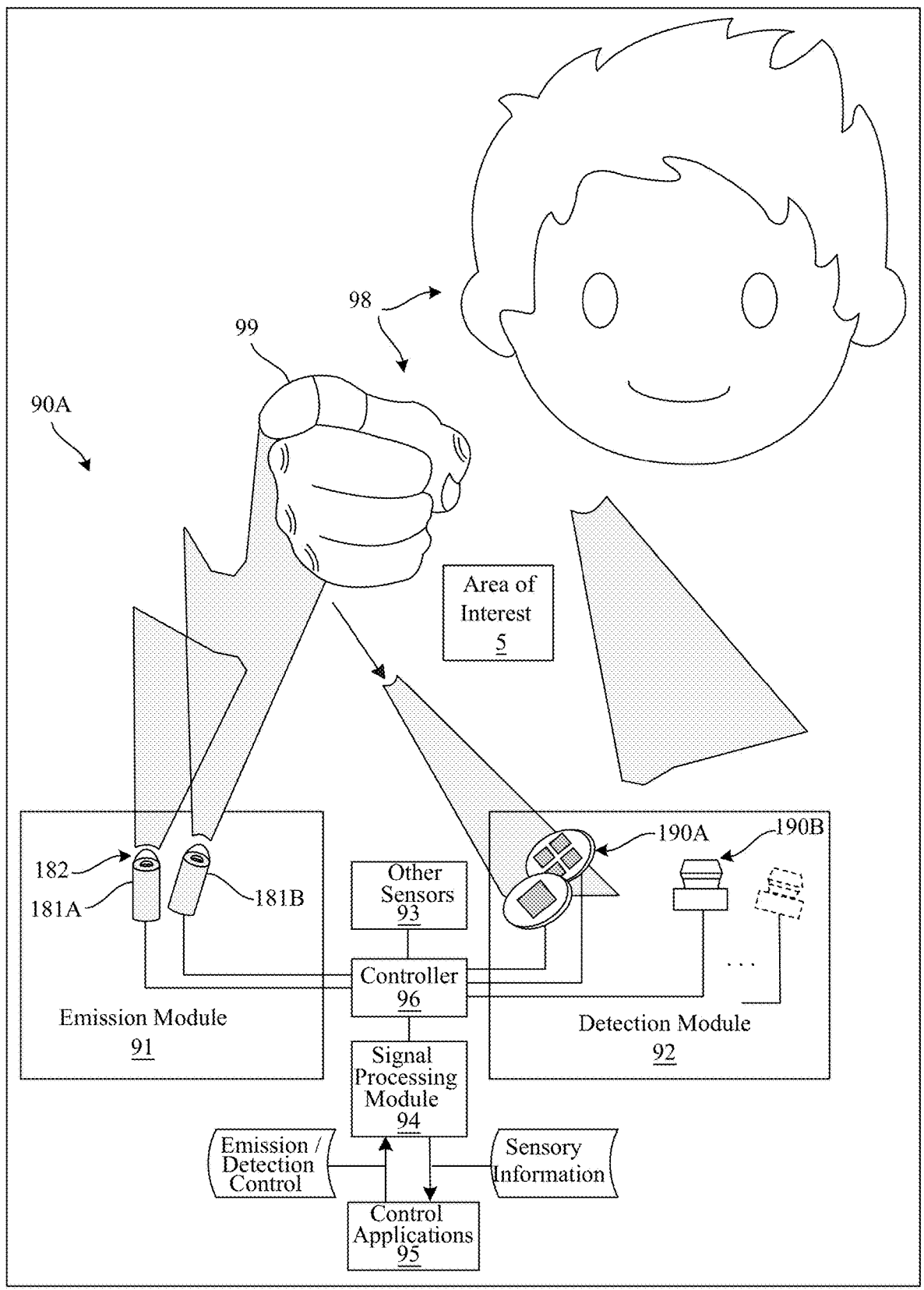
FIG. 8 illustrates an exemplary Machine Sensory and Control System (MSCS) employed in accordance with some embodiments.
Figures 1, 8:
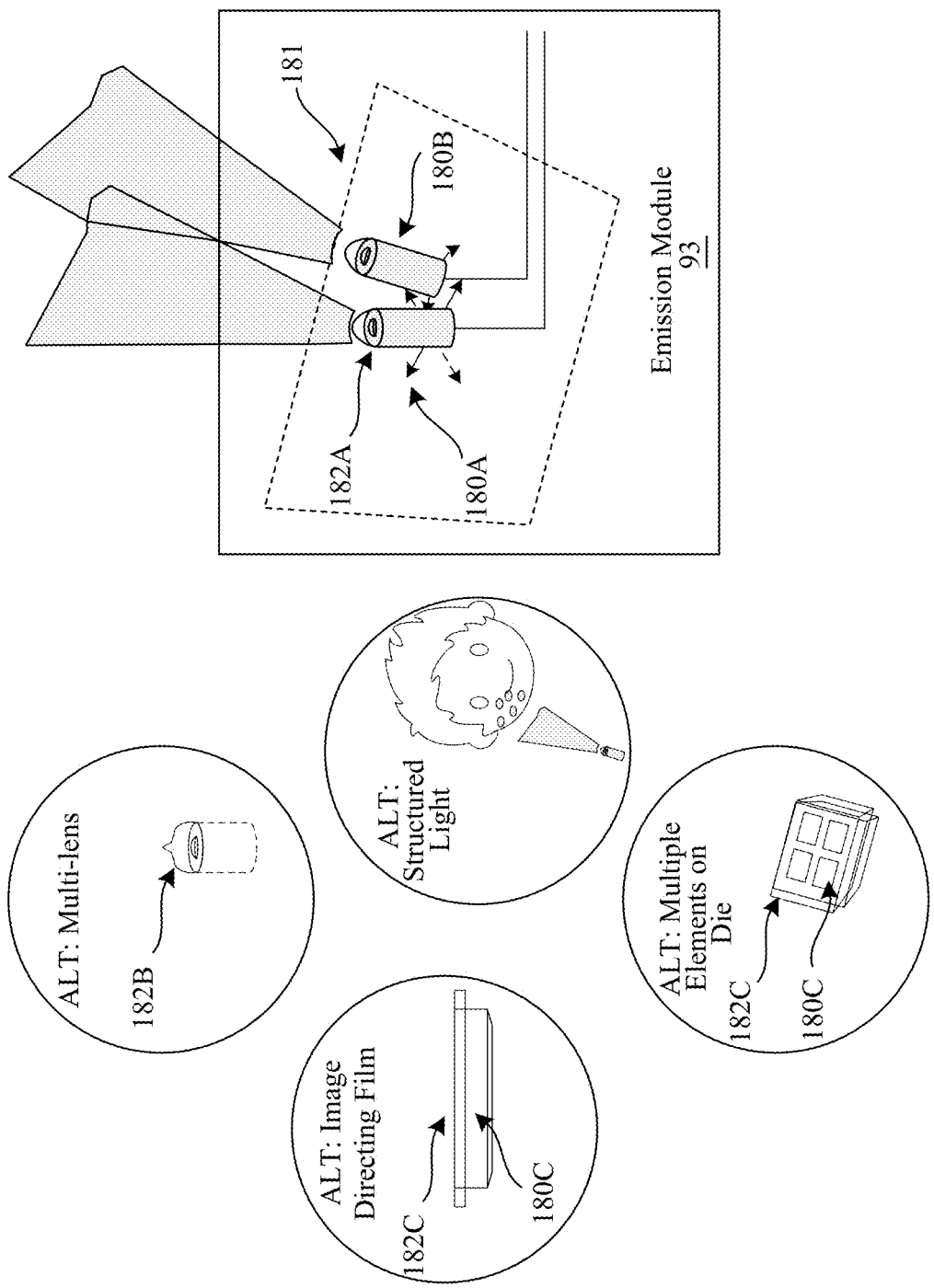
Figure 8:
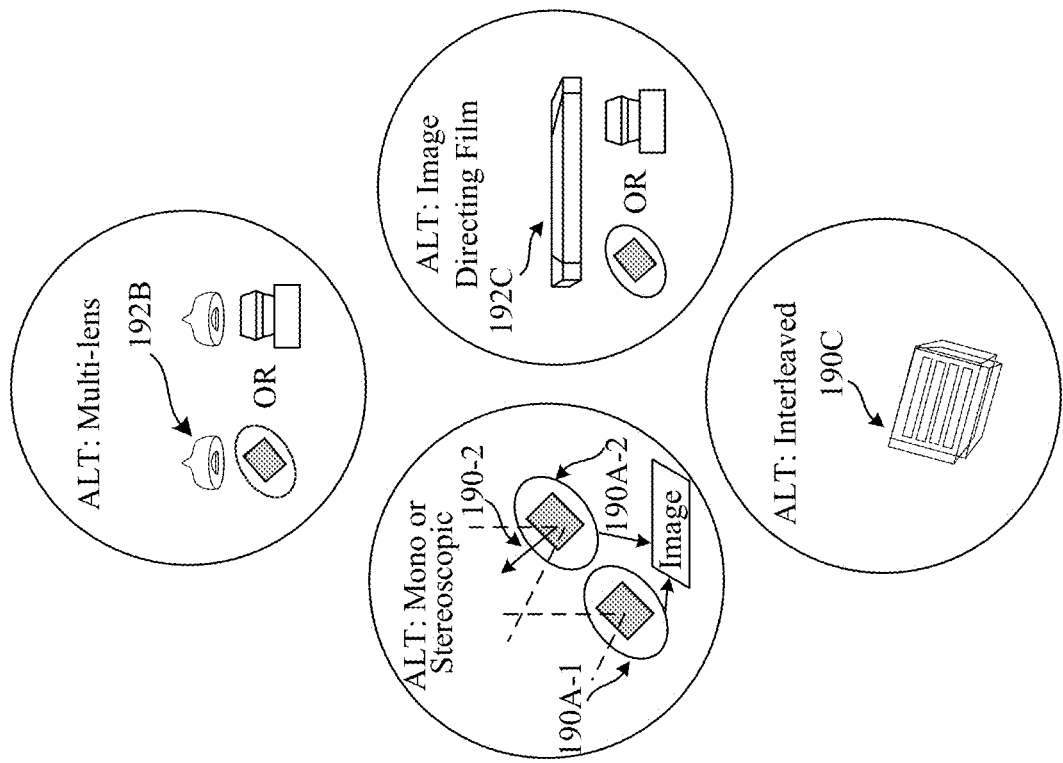
Figure 2:
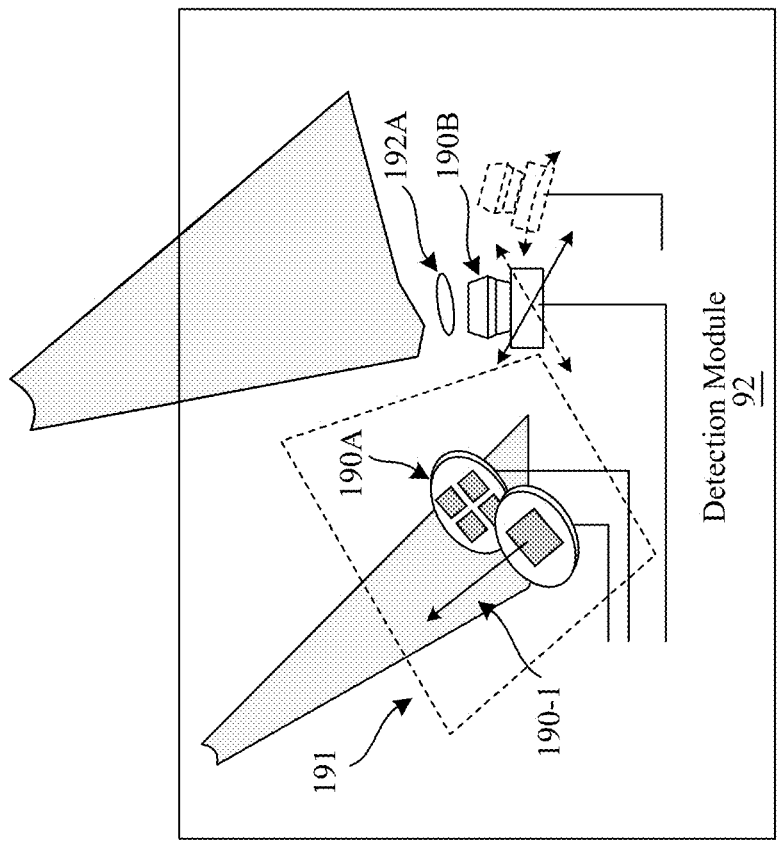

As FIG. 8 shows, one detection system 90A embodiment includes an emission module 91, a detection module 92, a controller 96, a processing module 94 and a machine control module 95. In one embodiment, the emission module includes one or more emitter(s) 180A, 180B (e.g., LEDs or other devices emitting light in the IR, visible, or other spectrum regions, or combinations thereof; radio and/or other electromagnetic signal emitting devices) that are controllable via emitter parameters (e.g., frequency, activation state, firing sequences and/or patterns, etc.) by the controller 96. However, other existing/emerging emission mechanisms and/or some combination thereof can also be utilized in accordance with the requirements of a particular implementation. The emitters 180A, 180B can be individual elements coupled with materials or devices 182 (and/or materials) (e.g., lenses 182A, multi-lenses 182B (of FIG. 8-1), image directing film (IDF) 182C (of FIG. 8-1), liquid lenses, combinations thereof, and/or others) with varying or variable optical properties to direct the emission, one or more arrays 180C of emissive elements (combined on a die or otherwise), with or without the addition of devices 182C for directing the emission, or combinations thereof, and positioned within an emission region 181 (of FIG. 8-1) according to one or more emitter parameters (i.e., either statically (e.g., fixed, parallel, orthogonal or forming other angles with a work surface, one another or a display or other presentation mechanism) or dynamically (e.g., pivot, rotate and/or translate) mounted, embedded (e.g., within a machine or machinery under control) or otherwise coupleable using an interface (e.g., wired or wireless)). In some embodiments, structured lighting techniques can provide improved surface feature capture capability by casting illumination according to a reference pattern onto the object 98. Image capture techniques described in further detail herein can be applied to capture and analyze differences in the reference pattern and the pattern as reflected by the object 98. In yet further embodiments, detection system 90A may omit emission module 91 altogether (e.g., in favor of ambient lighting).

In one embodiment, the detection module 92 includes one or more capture device(s) 190A, 190B (e.g., light (or other electromagnetic radiation sensitive devices) that are controllable via the controller 96. The capture device(s) 190A, 190B can comprise individual or multiple arrays of image capture elements 190A (e.g., pixel arrays, CMOS or CCD photo sensor arrays, or other imaging arrays) or individual or arrays of photosensitive elements 190B (e.g., photodiodes, photo sensors, single detector arrays, multi-detector arrays, or other configurations of photo sensitive elements) or combinations thereof. Arrays of image capture device(s) 190C (of FIG. 8-2) can be interleaved by row (or column or a pattern or otherwise addressable singly or in groups). However, other existing/emerging detection mechanisms and/or some combination thereof can also be utilized in accordance with the requirements of a particular implementation. Capture device(s) 190A, 190B each can include a particular vantage point 190-1 from which objects 98 within area of interest 5 are sensed and can be positioned within a detection region 191 (of FIG. 8-2) according to one or more detector parameters (i.e., either statically (e.g., fixed, parallel, orthogonal or forming other angles with a work surface, one another or a display or other presentation mechanism) or dynamically (e.g. pivot, rotate and/or translate), mounted, embedded (e.g., within a machine or machinery under control) or otherwise coupleable using an interface (e.g., wired or wireless)). Capture devices 190A, 190B can be coupled with devices 192 (and/or materials) (of FIG. 8-2) (e.g., lenses 192A (of FIG. 8-2), multi-lenses 192B (of FIG. 8-2), image directing film (IDF) 192C (of FIG. 8-2), liquid lenses, combinations thereof, and/or others) with varying or variable optical properties for directing the reflectance to the capture device for controlling or adjusting resolution, sensitivity and/or contrast. Capture devices 190A, 190B can be designed or adapted to operate in the IR, visible, or other spectrum regions, or combinations thereof; or alternatively operable in conjunction with radio and/or other electromagnetic signal emitting devices in various applications. In an embodiment, capture devices 190A, 190B can capture one or more images for sensing objects 98 and capturing information about the object (e.g., position, motion, etc.). In embodiments comprising more than one capture device, particular vantage points of capture devices 190A, 190B can be directed to area of interest 5 so that fields of view 190-2 of the capture devices at least partially overlap. Overlap in the fields of view 190-2 provides capability to employ stereoscopic vision techniques (see, e.g., FIG. 8-2), including those known in the art to obtain information from a plurality of images captured substantially contemporaneously.

While illustrated with reference to a particular embodiment in which control of emission module 91 and detection module 92 are co-located within a common controller 96, it should be understood that these functions will be separate in some embodiments, and/or incorporated into one or a plurality of elements comprising emission module 91 and/or detection module 92 in some embodiments. Controller 96 comprises control logic (hardware, software or combinations thereof) to conduct selective activation/de-activation of emitter(s) 180A, 180B (and/or control of active directing devices) in on-off, or other activation states or combinations thereof to produce emissions of varying intensities in accordance with a scan pattern which can be directed to scan an area of interest 5. Controller 96 can comprise control logic (hardware, software or combinations thereof) to conduct selection, activation and control of capture device(s) 190A, 190B (and/or control of active directing devices) to capture images or otherwise sense differences in reflectance or other illumination. Signal processing module 94 determines whether captured images and/or sensed differences in reflectance and/or other sensor-perceptible phenomena indicate a possible presence of one or more objects of interest 98, including control objects 99, the presence and/or variations thereof can be used to control machines and/or other applications 95.

In various embodiments, the variation of one or more portions of interest of a user can correspond to a variation of one or more attributes (position, motion, appearance, surface patterns) of a user hand 99, finger(s), points of interest on the hand 99, facial portion 98 other control objects (e.g., styli, tools) and so on (or some combination thereof) that is detectable by, or directed at, but otherwise occurs independently of the operation of the machine sensory and control system. Thus, for example, the system is configurable to 'observe' ordinary user locomotion (e.g., motion, translation, expression, flexing, deformation, and so on), locomotion directed at controlling one or more machines (e.g., gesturing, intentionally system-directed facial contortion, etc.), attributes thereof (e.g., rigidity, deformation, fingerprints, veins, pulse rates and/or other biometric parameters). In one embodiment, the system provides for detecting that some variation(s) in one or more portions of interest (e.g., fingers, fingertips, or other control surface portions) of a user has occurred, for determining that an interaction with one or more machines corresponds to the variation(s), for determining if the interaction should occur, and, if so, for at least one of initiating, conducting, continuing, discontinuing and/or modifying the interaction and/or a corresponding interaction.

Figure 9:
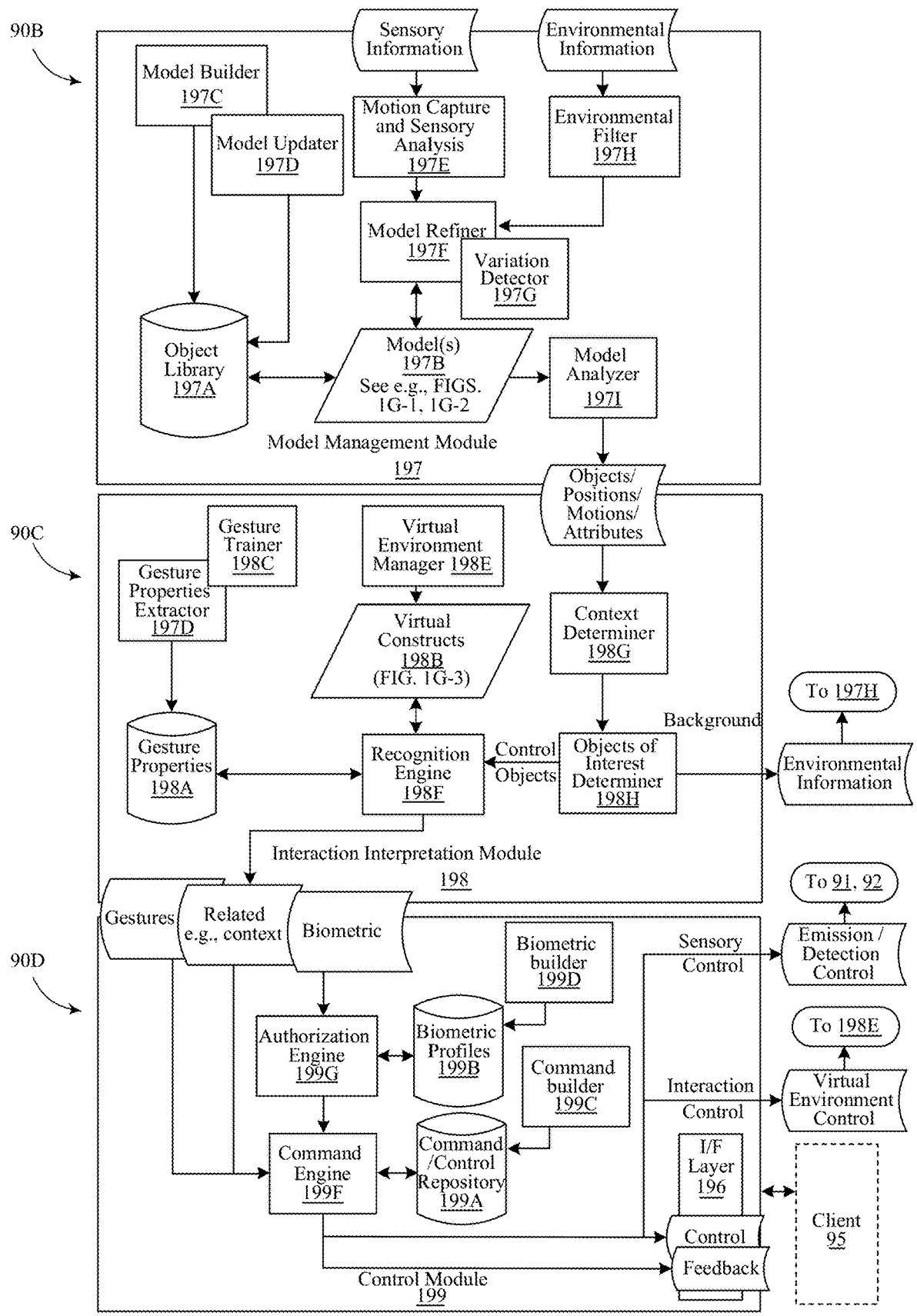
Figures 1, 9:
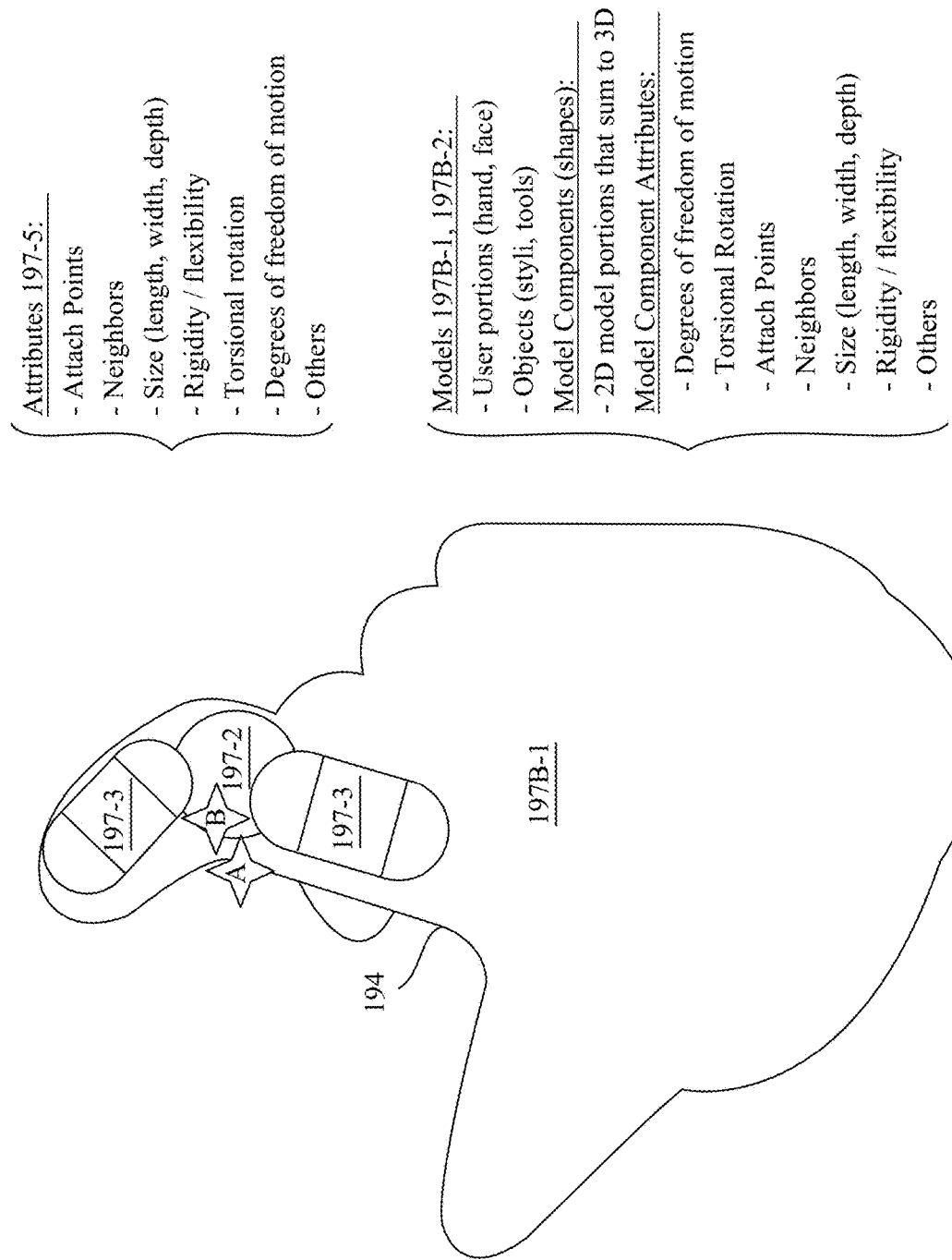
Figures 2, 9:
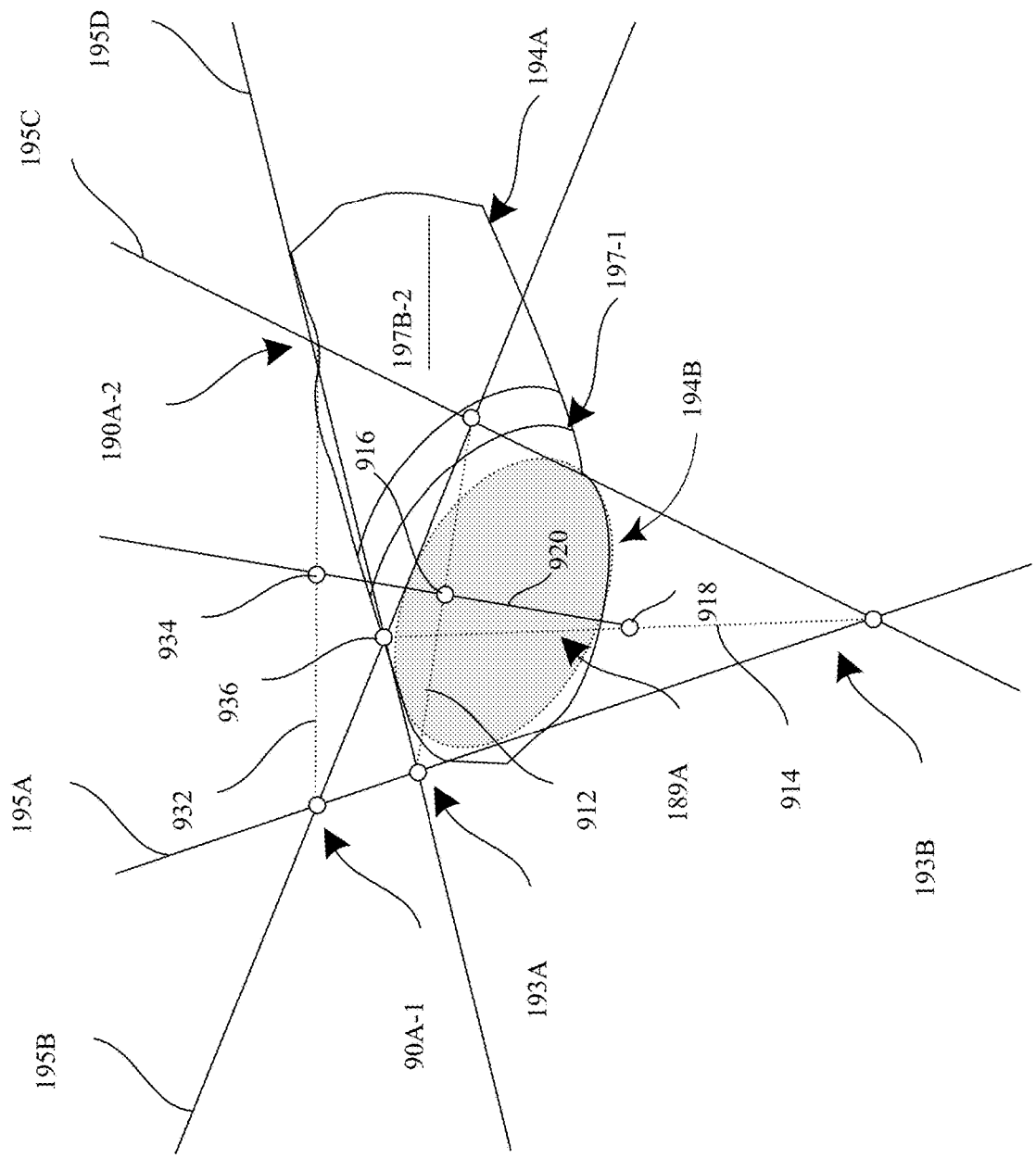

For example and with reference to FIG. 9, a variation determination system 90B embodiment comprises a model management module 197 that provides functionality to build, modify, customize one or more models to recognize variations in objects, positions, motions and attribute state and/or change in attribute state (of one or more attributes) from sensory information obtained from detection system 90A. A motion capture and sensory analyzer 197E finds motions (i.e., translational, rotational), conformations, and presence of objects within sensory information provided by detection system 90A. The findings of motion capture and sensory analyzer 197E serve as input of sensed (e.g., observed) information from the environment with which model refiner 197F can update predictive information (e.g., models, model portions, model attributes, etc.).

A model management module 197 embodiment comprises a model refiner 197F to update one or more models 197B (or portions thereof) from sensory information (e.g., images, scans, other sensory-perceptible phenomenon) and environmental information (i.e., context, noise, etc.); enabling a model analyzer 197I to recognize object, position, motion and attribute information that might be useful in controlling a machine. Model refiner 197F employs an object library 197A to manage objects including one or more models 197B (i.e., of user portions (e.g., hand, face), other control objects (e.g., styli, tools)) or the like (see e.g., model 197B-1, 197B-2 of FIGS. 9-1, 9-2)), model components (i.e., shapes, 2D model portions that sum to 3D, outlines 194 and/or outline portions 194A, 194B (i.e., closed curves), attributes 197-5 (e.g., attach points, neighbors, sizes (e.g., length, width, depth), rigidity/flexibility, torsional rotation, degrees of freedom of motion and others) and so forth) (see e.g., 197B-1-197B-2 of FIGS. 9-1-9-2), useful to define and update models 197B, and model attributes 197-5. While illustrated with reference to a particular embodiment in which models, model components and attributes are co-located within a common object library 197A, it should be understood that these objects will be maintained separately in some embodiments.

FIG. 9-1 illustrates prediction information including a model 197B-1 of a control object (e.g., FIG. 8: 99) constructed from one or more model subcomponents 197-2, 197-3 selected and/or configured to represent at least a portion of a surface of control object 99, a virtual surface portion 194 and one or more attributes 197-5. Other components can be included in prediction information 197B-1 not shown in FIG. 9-1 for clarity sake. In an embodiment, the model subcomponents 197-2, 197-3 can be selected from a set of radial solids, which can reflect at least a portion of a control object 99 in terms of one or more of structure, motion characteristics, conformational characteristics, other types of characteristics of control object 99, and/or combinations thereof. In one embodiment, radial solids include a contour and a surface defined by a set of points having a fixed distance from the closest corresponding point on the contour. Another radial solid embodiment includes a set of points normal to points on a contour and a fixed distance therefrom. In an embodiment, computational technique(s) for defining the radial solid include finding a closest point on the contour and the arbitrary point, then projecting outward the length of the radius of the solid. In an embodiment, such projection can be a vector normal to the contour at the closest point. An example radial solid (e.g., 197-3) includes a "capsuloid", i.e., a capsule shaped solid including a cylindrical body and semi-spherical ends. Another type of radial solid (e.g., 197-2) includes a sphere. Other types of radial solids can be identified based on the foregoing teachings.

In an embodiment and with reference to FIGS. 8, 9-2, updating predictive information to observed information comprises selecting one or more sets of points (e.g., FIG. 9-2:193A, 193B) in space surrounding or bounding the control object within a field of view of one or more image capture device(s). As shown by FIG. 9-2, points 193 can be determined using one or more sets of lines 195A, 195B, 195C, and 195D originating at vantage point(s) (e.g., FIG. 8: 190-1, 190-2) associated with the image capture device(s) (e.g., FIG. 8: 190A-1, 190A-2) and determining therefrom one or more intersection point(s) defining a bounding region (i.e., region formed by lines FIG. 9-2: 195A, 195B, 195C, and 195D) surrounding a cross-section of the control object. The bounding region can be used to define a virtual surface (FIG. 9-2: 194) to which model subcomponents 197-1, 197-2, 197-3, and 197-4 can be compared. The virtual surface 194 can include a visible portion 194A and a non-visible "inferred" portion 194B. Virtual surfaces 194 can include straight portions and/or curved surface portions of one or more virtual solids (i.e., model portions) determined by model refiner 197F.

For example and according to one embodiment illustrated by FIG. 9-2, model refiner 197F determines to model subcomponent 197-1 of an object portion (happens to be a finger) using a virtual solid, an ellipse in this illustration, or any of a variety of 3D shapes (e.g., ellipsoid, sphere, or custom shape) and/or 2D slice(s) that are added together to form a 3D volume. Accordingly, beginning with generalized equations for an ellipse (1) with (x, y) being the coordinates of a point on the ellipse, $(x_C, y_C)$ the center, a and b the axes, and $\theta$ the rotation angle. The coefficients $C_1$, $C_2$ and $C_3$ are defined in terms of these parameters, as shown:

$$C_1 x^2 + C_2 xy + C_3 y^2 - (2C_1 x_c + C_2 y_c)x - \quad (1)$$
$$(2C_3 y_c + C_2 x_c)y + (C_1 x_c^2 + C_2 x_c y_c + C_3 y_c^2 - 1) = 0$$

$$C_1 = \frac{\cos^2\theta}{a^2} + \frac{\sin^2\theta}{b^2}$$

$$C_2 = -2\cos\theta\sin\theta\left(\frac{1}{a^2} - \frac{1}{b^2}\right)$$

$$C_3 = \frac{\sin^2\theta}{a^2} + \frac{\cos^2\theta}{b^2}$$

The ellipse equation (1) is solved for $\theta$, subject to the constraints that: (1) $(x_C, y_C)$ must lie on the centerline determined from the four tangents 195A, 195B, 195C, and 195D (i.e., centerline 189A of FIGS. 9-2); and (2) a is fixed at the assumed value $a_0$. The ellipse equation can either be solved for $\theta$ analytically or solved using an iterative numerical solver (e.g., a Newtonian solver as is known in the art). An analytic solution can be obtained by writing an equation for the distances to the four tangent lines given a $y_C$ position, then solving for the value of $y_C$ that corresponds to the desired radius parameter $a=a_0$. Accordingly, equations (2) for four tangent lines in the x-y plane (of the slice), in which coefficients $A_i$, $B_i$ and $D_i$ (for i=1 to 4) are determined from the tangent lines 195A, 195B, 195C, and 195D identified in an image slice as described above.

$$A_1 x + B_1 y + D_1 = 0$$

$$A_2 x + B_2 y + D_2 = 0$$

$$A_3 x + B_3 y + D_3 = 0$$

$$A_4 x + B_4 y + D_4 = 0 \quad (2)$$

Four column vectors $r_{12}$, $r_{23}$, $r_{14}$ and $r_{24}$ are obtained from the coefficients $A_i$, $B_i$ and $D_i$ of equations (2) according to equations (3), in which the "\" operator denotes matrix left division, which is defined for a square matrix M and a column vector v such that M\v=r, where r is the column vector that satisfies Mr=v:

$$r_{13} = \begin{bmatrix} A_1 & B_1 \\ A_3 & B_3 \end{bmatrix} \backslash \begin{bmatrix} -D_1 \\ -D_3 \end{bmatrix} \quad (3)$$

$$r_{23} = \begin{bmatrix} A_2 & B_2 \\ A_3 & B_3 \end{bmatrix} \backslash \begin{bmatrix} -D_{21} \\ -D_3 \end{bmatrix}$$

$$r_{14} = \begin{bmatrix} A_1 & B_1 \\ A_4 & B_4 \end{bmatrix} \backslash \begin{bmatrix} -D_1 \\ -D_4 \end{bmatrix}$$

$$r_{24} = \begin{bmatrix} A_2 & B_2 \\ A_4 & B_4 \end{bmatrix} \backslash \begin{bmatrix} -D_2 \\ -D_4 \end{bmatrix}$$

Four component vectors G and H are defined in equations (4) from the vectors of tangent coefficients A, B and D and scalar quantities p and q, which are defined using the column vectors $r_{12}$, $r_{23}$, $r_{14}$ and $r_{24}$ from equations (3).

$$c1 = (r_{13} + r_{24})/2$$

$$c2 = (r_{14} + r_{23})/2$$

$$\delta 1 = c2_1 - c1_1$$

$$\delta 2 = c2_2 - c1_2$$

$$p = \delta 1/\delta 2$$

$$q = c1_1 - c1_2 * p$$

$$G = Ap + B$$

$$H = Aq + D \quad (4)$$

Six scalar quantities $v_{A2}$, $v_{AB}$, $v_{B2}$, $w_{A2}$, $w_{AB}$, and $w_{B2}$ are defined by equation (5) in terms of the components of vectors G and H of equation (4).

$$v = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 0 \\ 1 \end{bmatrix}$$

$$w = \begin{bmatrix} G_2^2 & G_3^2 & G_4^2 \\ (G_2 H_2)^2 & (G_3 H_3)^2 & (G_4 H_4)^2 \\ H_2^2 & H_3^2 & H_4^2 \end{bmatrix} \backslash \begin{bmatrix} 0 \\ 1 \\ 0 \end{bmatrix}$$

$$v_{A2} = (v_1 A_1)^2 + (v_2 A_2)^2 + (v_3 A_3)^2$$

$$v_{AB} = (v_1 A_1 B_1)^2 + (v_2 A_2 B_2)^2 + (v_3 A_3 B_3)^2$$

$$v_{B2} = (v_1 B_1)^2 + (v_2 B_2)^2 + (v_3 B_3)^2$$

$$w_{A2} = (w_1 A_1)^2 + (w_2 A_2)^2 + (w_3 A_3)^2$$

$$w_{AB} = (w_1 A_1 B_1)^2 + (w_2 A_2 B_2)^2 + (w_3 A_3 B_3)^2$$

$$w_{B2} = (w_1 B_1)^2 + (w_2 B_2)^2 + (w_3 B_3)^2$$

Using the parameters defined in equations (1)-(5), solving for $\theta$ is accomplished by solving the eighth-degree polynomial equation (6) for t, where the coefficients $Q_i$ (for i=0 to 8) are defined as shown in equations (7)-(15).

$$0 = Q_8 t^8 + Q_7 t^7 + Q_6 t^6 + Q_5 t^5 + Q_4 t^4 + Q_3 t^3 + Q_2 t^2 + Q_1 t + Q_0 \quad (6)$$

The parameters $A_1$, $B_1$, $G_1$, $H_1$, $v_{A2}$, $v_{AB}$, $v_{B2}$, $w_{A2}$, $w_{AB}$, and $w_{B2}$ used in equations (7)-(15) are defined as shown in equations (1)-(4). The parameter n is the assumed semi-major axis (in other words, $a_0$). Once the real roots t are known, the possible values of $\theta$ are defined as $\theta = \mathrm{atan}(t)$.

$$Q_8 = 4A_1^2 n^2 v_{B2}^2 + 4v_{B2} B_1^2 (1 - n^2 v_{A2}) - (G_1 (1 - n^2 v_{A2}) w_{B2} + n^2 v_{B2} w_{A2} + 2H_1 v_{B2})^2 \quad (7)$$

$$Q_7 = -(2(2n^2 v_{AB} w_{A2} + 4H_1 v_{AB} + 2G_1 n^2 v_{AB} w_{B2} + 2G_1 (1 - n^2 v_{A2}) w_{AB}))(G_1 (1 - n^2 v_{A2}) w_{B2} + n^2 v_{B2} w_{A2} + 2H_1 v_{B2}) - 8A_1 B_1 n^2 v_{B2}^2 + 16A_1^2 n^2 v_{AB} v_{B2} + (4(2A_1 B_1 (1 - n^2 v_{A2}) + 2B_1^2 n^2 v_{AB})) v_{B2} + 8B_1^2 (1 - n^2 v_{A2}) v_{AB} \quad (8)$$

$$Q_6 = -(2(2H_1 v_{B2} + 2H_1 v_{A2} + n^2 v_{A2} w_{A2} + n^2 v_{B2} (-2w_{AB} + w_{B2}) + G_1 (n^2 v_{B2} + 1) w_{B2} + 4G_1 n^2 v_{AB} w_{AB} + G_1 (1 - n^2 v_{A2}) v_{A2})) \times (G_1 (1 - n^2 v_{A2}) w_{B2} + n^2 v_{B2} w_{A2} + 2H_1 v_{B2}) - (2n^2 v_{AB} w_{A2} + 4H_1 v_{AB} + 2G_1 n^2 v_{AB} w_{B2} + 2G_1 (1 - n^2 v_{A2}) w_{AB})^2 + 4B_1^2 n^2 v_{B2}^2 - 32A_1 B_1 n^2 v_{AB} v_{B2} 4A_1^2 n^2 (2v_{A2} v_{B2} + 4v_{AB}^2) + 4A_1^2 n^2 v_{B2}^2 + (4(A_1^2 (1 - n^2 v_{A2}) + 4A_1 B_1 n^2 v_{AB} + B_1^2 (-n^2 v_{B2} + 1) + B_1^2 (1 - n^2 v_{A2}))) v_{B2} + (8(2A_1 B_1 (1 - n^2 v_{A2}) + 2B_1^2 n^2 v_{AB})) v_{AB} + 4B_1^2 (1 - n^2 v_{A2}) v_{A2} \quad (9)$$

$$Q_5 = -(2(4H_1 V_{AB} + 2G_1 (-n^2 v_{B2} + 1) w_{AB} + 2G_1 n^2 v_{AB} v_{A2} + 2n^2 v_A (-2w_{AB} + w_{B2}))) (G_1 (1 - n^2 v_{A2}) w_{B2} + n^2 v_{B2} w_{A2} + 2H_1 v_{B2}) - (1(2H_1 v_{B2} + 2H_1 v_{A2} + n^2 v_{A2} w_{A2} + n^2 v_{B2} (-2w_{AB} + w_{B2}) + G_1 (-n^2 v_{B2} + 1) w_{B2} + 4G_1 n^2 v_{AB} w_{AB} + G_1 (1 - n^2 v_{A2})) \times (2n^2 v_{AB} w_{A2} + 4H_1 v_{AB} + 2G_1 n^2 v_{AB} w_{B2} + 2G_1 (1 - n^2 v_{A2}) w_{AB}) + 16B_1^2 n^2 v_{AB} v_{B2} - 8A_1 B_1 n^2 (2v_{A2} v_{B2} + 4v_{AB}^2) + 16A_1^2 n^2 v_{A2} v_{AB} - 8A_1 B_1 n^2 v_{B2}^2 + 16A_1^2 n^2 v_{AB} v_{B2} + (4(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{B2} + (8(A_1^2 (1 - n^2 v_{A2}) + 4A_1 B_1 n^2 v_{AB} + B_1^2 (-n^2 v_{B2} + 1) + B_1^2 (1 - n^2 v_{A2}))) v_{AB} + (4(2A_1 B_1 (1 - n^2 v_{A2}) + 2B_1^2 n^2 v_{AB})) v_{A2} \quad (10)$$

$$Q_4 = (4(A_1^2 (-n^2 v_{B2}) + A_1^2 (1 - n^2 v_{A2}) + 4A_1 B_1 n^2 v_{AB} + B_1^2 (-n^2 v_{B2} + 1))) v_{B2} + (8(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{AB} + (4(A_1^2 (1 - n^2 v_{A2}) + 4A_1 B_1 n^2 v_{AB} + B_1^2 (-n^2 v_{B2} + 1) + B_1^2 (1 - n^2 v_{A2}))) v_{A2} + 4B_1^2 n^2 (2v_{A2} v_{B2} + 4v_{AB}^2) - 32A_1 B_1 n^2 v_{A2} v_{AB} + 4A_1^2 n^2 v_{A2}^2 + 4B_1^2 n^2 v_{B2}^2 - 32A_1 B_1 n^2 v_{AB} v_{B2} + 4A_1^2 n^2 (2v_{A2} v_{B2} + 4v_{AB}^2) - (2(G_1 (-n^2 v_{B2} + 1) v_{A2} + n^2 v_{A2} (-2w_{AB} + w_{B2}) + 2H_1 v_{A2}))(G_1 (1 - n^2 v_{A2}) w_{B2} + n^2 v_{B2} w_{A2} + 2H_1 v_{B2}) - (2(4H_1 v_{AB} + 2G_1 (-n^2 v_{B2} + 1) w_{AB} + 2G_1 n^2 v_{AB} v_{A2} + 2n^2 v_{AB} (-2w_{AB} + w_{B2}))) \times (2n^2 v_{AB} w_{A2} + 4H_1 v_{AB} + 2G_1 n^2 v_{AB} w_{B2} + 2G_1 (1 - n^2 v_{A2}) w_{AB}) - (2H_1 v_{B2} + 2H_1 v_{A2} + n^2 v_{A2} w_{A2} + n^2 v_{B2} (-2w_{AB} + w_{B2}) + G_1 (-n^2 v_{B2} + 1) w_{B2} + 4G_1 n^2 v_{AB} v_{AB} + G_1 (1 - n^2 v_{A2}) v_{A2})^2 \quad (11)$$

$$Q_3 = -(2(G_1 (-n^2 v_{B2} + 1) v_{A2} + n^2 v_{A2} (-2w_{AB} + w_{B2}) + 2H_1 v_{A2}))(2n^2 v_{AB} w_{A2} + 4H_1 v_{AB} + 2G_1 n^2 v_{AB} w_{B2} + 2G_1 (1 - n^2 v_{A2}) w_{AB}) - (2(4H_1 v_{AB} + 2G_1 (-n^2 v_{B2} + 1) w_{AB} + 2G_1 n^2 v_{AB} v_{A2} + 2n^2 v_{AB} (-2w_{AB} + w_{B2}))) \times (2H_1 v_{B2} + 2H_1 v_{A2} + n^2 v_{A2} w_{A2} + n^2 v_{B2} (-2w_{AB} + w_{B2}) + G_1 (-n^2 v_{B2} + 1) w_{B2} + 4G_1 n^2 v_{AB} w_{AB} + G_1 (1 - n^2 v_{A2}) v_{A2}) + 16B_1^2 n^2 v_{A2} v_{AB} - 8A_1 B_1 n^2 v_{A2}^2 + 16B_1^2 n^2 v_{AB} v_{B2} - 8A_1 B_1 n^2 (2v_{A2} v_{B2} + 4v_{AB}^2) + 16A_1^2 n^2 v_{A2} v_{AB} + (4(2A_1^2 n^2 v_{AB} + 2A_1 B_1 (-n^2 v_{B2} + 1))) v_{B2} + (8(A_1^2 (-n^2 v_{B2} + 1) + A_1^2 (1 - n^2 v_{A2}) + 4A_1 B_1 n^2 v_{AB} + B_1^2 (-n^2 v_{B2} + 1))) v_{AB} + (4(2A_1^2 n^2 v_{AB} + 2A_1 B_1 (-n^2 v_{B2} + 1) + 2A_1 B_1 (1 - n^2 v_{A2}) + 2B_1^2 n^2 v_{AB})) v_{A2} \quad (12)$$

$$Q_2 = 4A_1^2 (-n^2 v_{B2} + 1) v_{B2} + (8(2A_1^2 n^2 v_{AB} + 2A_1 B_1 (-n^2 v_{B2} + 1))) v_{AB} + (4(A_1^2 (-n^2 v_{B2} + 1) + A_1^2 (1 - n^2 v_{A2}) + 4A_1 B_1 n^2 v_{AB} + B_1^2 (-n^2 v_{B2} + 1))) v_{A2} + 4B_1^2 n^2 v_{A2}^2 + 4B_1^2 n^2 (2v_{A2} v_{B2} + 4v_{AB}^2) - 32A_1 B_1 n^2 v_{A2} v_{AB} + 4A_1^2 n^2 v_{A2}^2 - (2(G_1 (-n^2 v_{B2} + 1) v_{A2} + n^2 v_{A2} (-2w_{AB} + w_{B2}) + 2H_1 v_{A2})) \times (2H_1 v_{B2} + 2H_1 v_{A2} + n^2 v_{A2} w_{A2} + n^2 v_{B2} (-2w_{AB} + w_{B2}) + G_1 (-n^2 v_{B2} + 1) w_{B2} + 4G_1 n^2 v_{AB} w_{AB} + G_1 (1 - n^2 v_{A2}) v_{A2}) - (4H_1 v_{AB} + 2G_1 (-n^2 v_{B2} + 1) w_{AB} + 2G_1 n^2 v_{AB} + 1 n^2 v_{AB} (-2w_{AB} + w_{B2}))^2 \quad (13)$$

$$Q_1 = 8A_1^2 (-n^2 v_{B2} + 1) v_{AB} + (4(2A_1^2 n^2 v_{AB} + 2A_1 B_1 (-n^2 v_{B2} + 1))) v_{A2} + 16B_1^2 n^2 v_{A2} v_{AB} - 8A_1 B_1 n^2 v_{A2}^2 - (2(G_1 (-n^2 v_{B2} + 1) v_{A2} + n^2 v_{A2} (-2w_{AB} + w_{B2}) + 2H_1 v_{A2}))(4H_1 v_{AB} + 2G_1 (-n^2 v_{B2} + 1) w_{AB} + 2G_1 n^2 v_{AB} v_{A2} + 2n^2 v_{AB} (-2w_{AB} + w_{B2})) \quad (14)$$

$$Q_0 = 4A_1^2 (-n^2 v_{B2} + 1) v_{A2} - (G_1 (-n^2 v_{B2} + 1) v_{A2} + n^2 v_{A2} (-2w_{AB} + w_{B2}) + 2H_1 v_{A2})^2 + 4B_1^2 n^2 v_{A2}^2 \quad (15)$$

In this exemplary embodiment, equations (6)-(15) have at most three real roots; thus, for any four tangent lines, there are at most three possible ellipses that are tangent to all four lines and that satisfy the $a = a_0$ constraint. (In some instances, there may be fewer than three real roots.) For each real root $\theta$, the corresponding values of $(x_C, y_C)$ and b can be readily determined. Depending on the particular inputs, zero or more solutions will be obtained; for example, in some instances, three solutions can be obtained for a typical configuration of tangents. Each solution is completely characterized by the parameters $\{\theta, a = a_0, b, (x_C, y_C)\}$. Alternatively, or additionally, a model builder 197C and model updater 197D provide functionality to define, build and/or customize model(s) 197B using one or more components in object library 197A. Once built, model refiner 197F updates and refines the model, bringing the predictive information of the model in line with observed information from the detection system 90A.

The model subcomponents 197-1, 197-2, 197-3, and 197-4 can be scaled, sized, selected, rotated, translated, moved, or otherwise re-ordered to enable portions of the model corresponding to the virtual surface(s) to conform within the points 193 in space. Model refiner 197F employs a variation detector 197G to substantially continuously determine differences between sensed information and predictive information and provide to model refiner 197F a variance useful to adjust the model 197B accordingly. Variation detector 197G and model refiner 197F are further enabled to correlate among model portions to preserve continuity with characteristic information of a corresponding object being modeled, continuity in motion, and/or continuity in deformation, conformation and/or torsional rotations.

An environmental filter 197H reduces extraneous noise in sensed information received from the detection system 90A using environmental information to eliminate extraneous elements from the sensory information. Environmental filter 197H employs contrast enhancement, subtraction of a difference image from an image, software filtering, and background subtraction (using background information provided by objects of interest determiner 198H (see below) to enable model refiner 197F to build, refine, manage and maintain model(s) 197B of objects of interest from which control inputs can be determined.

A model analyzer 197I determines that a reconstructed shape of a sensed object portion matches an object model in an object library; and interprets the reconstructed shape (and/or variations thereon) as user input. Model analyzer 197I provides output in the form of object, position, motion and attribute information to an interaction system 90C.

Figures 3, 9:
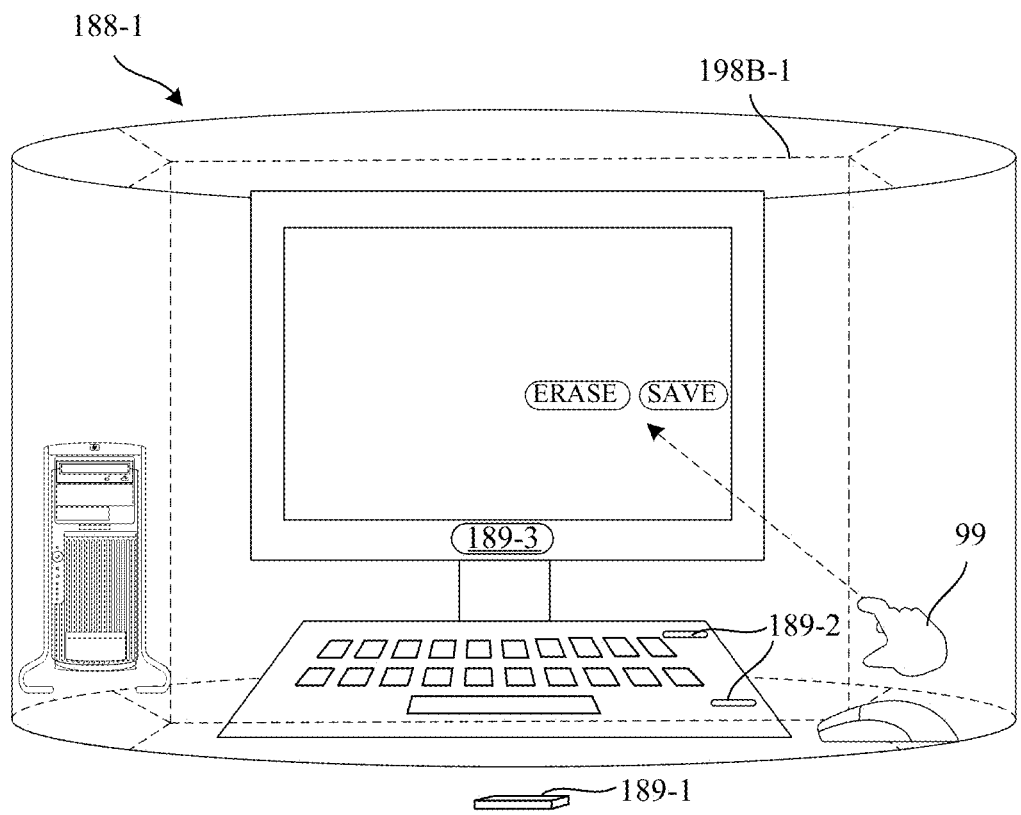
Figures 4, 9:
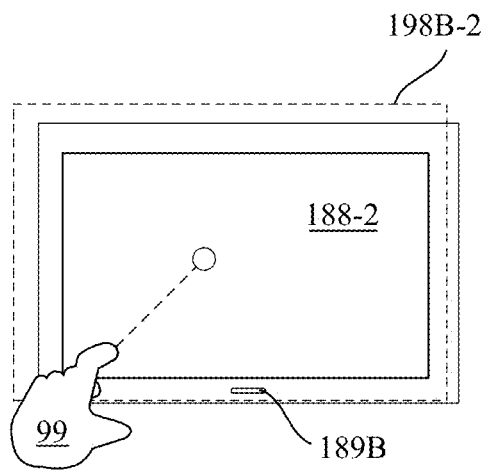

Again with reference to FIG. 9, an interaction system 90C includes an interaction interpretation module 198 that provides functionality to recognize command and other information from object, position, motion and attribute information obtained from variation system 90B. An interaction interpretation module 198 embodiment comprises a recognition engine 198F to recognize command information such as command inputs (i.e., gestures and/or other command inputs (e.g., speech, etc.)), related information (i.e., biometrics), environmental information (i.e., context, noise, etc.)

and other information discernable from the object, position, motion and attribute information that might be useful in controlling a machine. Recognition engine 198F employs gesture properties 198A (e.g., path, velocity, acceleration, etc.), control objects determined from the object, position, motion and attribute information by an objects of interest determiner 198H and optionally one or more virtual constructs 198B (see e.g., FIGS. 9-3, 9-4: 198B-1, 198B-2) to recognize variations in control object presence or motion indicating command information, related information, environmental information and other information discernable from the object, position, motion and attribute information that might be useful in controlling a machine. With reference to FIG. 9-3, 9-4, virtual construct 198B-1, 198B-2 implement an engagement target with which a control object 99 interacts—enabling MSCS 189 to discern variations in control object (i.e., motions into, out of or relative to virtual construct 198B) as indicating control or other useful information. A gesture trainer 198C and gesture properties extractor 198D provide functionality to define, build and/or customize gesture properties 198A.

A context determiner 198G and object of interest determiner 198H provide functionality to determine from the object, position, motion and attribute information objects of interest (e.g., control objects, or other objects to be modeled and analyzed), objects not of interest (e.g., background) based upon a detected context. For example, when the context is determined to be an identification context, a human face will be determined to be an object of interest to the system and will be determined to be a control object. On the other hand, when the context is determined to be a fingertip control context, the finger tips will be determined to be object(s) of interest and will be determined to be a control objects whereas the user's face will be determined not to be an object of interest (i.e., background). Further, when the context is determined to be a styli (or other tool) held in the fingers of the user, the tool tip will be determined to be object of interest and a control object whereas the user's fingertips might be determined not to be objects of interest (i.e., background). Background objects can be included in the environmental information provided to environmental filter 197H of model management module 197.

A virtual environment manager 198E provides creation, selection, modification and de-selection of one or more virtual constructs 198B (see FIGS. 9-3, 9-4). In some embodiments, virtual constructs (e.g., a virtual object defined in space; such that variations in real objects relative to the virtual construct, when detected, can be interpreted for control or other purposes (see FIGS. 9-3, 9-4)) are used to determine variations (i.e., virtual "contact" with the virtual construct, breaking of virtual contact, motion relative to a construct portion, etc.) to be interpreted as engagements, dis-engagements, motions relative to the construct(s), and so forth, enabling the system to interpret pinches, pokes and grabs, and so forth. Interaction interpretation module 198 provides as output the command information, related information and other information discernable from the object, position, motion and attribute information that might be useful in controlling a machine from recognition engine 198F to an application control system 90D.

Further with reference to FIG. 9, an application control system 90D includes a control module 199 that provides functionality to determine and authorize commands based upon the command and other information obtained from interaction system 90C.

A control module 199 embodiment comprises a command engine 199F to determine whether to issue command(s) and what command(s) to issue based upon the command information, related information and other information discernable from the object, position, motion and attribute information, as received from an interaction interpretation module 198. Command engine 199F employs command/control repository 199A (e.g., application commands, OS commands, commands to MSCS, misc. commands) and related information indicating context received from the interaction interpretation module 198 to determine one or more commands corresponding to the gestures, context, etc. indicated by the command information. For example, engagement gestures can be mapped to one or more controls, or a control-less screen location, of a presentation device associated with a machine under control. Controls can include imbedded controls (e.g., sliders, buttons, and other control objects in an application), or environmental level controls (e.g., windowing controls, scrolls within a window, and other controls affecting the control environment). In embodiments, controls may be displayed using 2D presentations (e.g., a cursor, cross-hairs, icon, graphical representation of the control object, or other displayable object) on display screens and/or presented in 3D forms using holography, projectors or other mechanisms for creating 3D presentations, or audible (e.g., mapped to sounds, or other mechanisms for conveying audible information) and/or touchable via haptic techniques.

Further, an authorization engine 199G employs biometric profiles 199B (e.g., users, identification information, privileges, etc.) and biometric information received from the interaction interpretation module 198 to determine whether commands and/or controls determined by the command engine 199F are authorized. A command builder 199C and biometric profile builder 199D provide functionality to define, build and/or customize command/control repository 199A and biometric profiles 199B.

Selected authorized commands are provided to machine(s) under control (i.e., "client") via interface layer 196. Commands/controls to the virtual environment (i.e., interaction control) are provided to virtual environment manager 198E. Commands/controls to the emission/detection systems (i.e., sensory control) are provided to emission module 91 and/or detection module 92 as appropriate.

In various embodiments and with reference to FIGS. 9-3, 9-4, a Machine Sensory Controller System 189 can be embodied as a standalone unit(s) 189-1 coupleable via an interface (e.g., wired or wireless)), embedded (e.g., within a machine 188-1, 188-2 or machinery under control) (e.g., FIG. 9-3: 189-2, 189-3, FIG. 9-4: 189B) or combinations thereof.

What is claimed is:

1. A method of providing guidance to a mobile device relative to a plurality of emitter arrays in a building, the method including:
   receiving in a mobile device first and second swept beam-formed signals emitted by first and second emitter arrays situated within a building, wherein the first and second swept beam-formed signals are associated with time related data that varies according to sweep of the first and second swept beam-formed signals;
   determining by the mobile device, a first angular position for the mobile device about the first emitter array from at least first received value of the time related data corresponding to receipt of a maximum amplitude detected by the mobile device from a beat of amplitude of a first mix of multiple frequencies comprising the first swept beam-formed signal during a sweep of the first swept beam-formed signal;

determining by the mobile device, a second angular position for the mobile device about the second emitter array from at least second received value of the time related data corresponding to receipt of a maximum amplitude detected by the mobile device from a beat of amplitude of a first mix of multiple frequencies of the second swept beam-formed signal during a sweep of the second swept beam-formed signal; and determining from the first angular position for the mobile device about the first emitter array and the second angular position for the mobile device about the second emitter array, a location of the mobile device within the building.

2. The method of claim 1, wherein the building in which the first emitter array and the second emitter array are disposed within is at least one of a factory floor, a warehouse, a sales floor, an indoor auto dealership or rental car agency.

3. The method of claim 1, further including the mobile device receiving geo-relevant information within the building responsive to the mobile device returning the location of the mobile device within the building.

4. The method of claim 3, further including the mobile device providing position based guidance, location and approach determination, flow control of attendees in at least one selected from an indoor convention, other indoor agglomeration of displays, and indoor attractions, responsive to the mobile device receiving geo-relevant information within the building.

5. The method of claim 3, further including the mobile device receiving geo-relevant information including a floor plan(s) and at least one selected from location(s) of indoor attractions, indoor landmarks and other indoor points of interest.

6. The method of claim 3, further including the mobile device determining from the geo-relevant information a preferred or desired direction to approach at least one selected from attractions, landmark and other points of interest within the building.

7. The method of claim 3, further including the mobile device determining from the geo-relevant information at least one selected from a preferred direction and a desired direction to approach to a person's office or cubicle within a large office environment.

8. The method of claim 3, further including the mobile device receiving interest profile(s) for users of like mobile devices and courses to navigate through at least one selected from location(s) of attractions, landmarks and other points of interest within the building.

9. The method of claim 8, further including the mobile device exchanging information about points of interest with users of like mobile devices within the building.

10. The method of claim 9, further including the mobile device exchanging crowd conditions, directions, and other present sense impression information with users of like mobile devices within the building thereby enabling dynamic coordination of behavior within a convention floor.

11. The method of claim 1, further including the mobile device discriminating between first and second swept beam-formed signals using detected different respective polarizations.

12. The method of claim 1, wherein the time related data comprises a series of time stamps; and further including determining the first angular position for the mobile device about the first emitter array from at least first received value of the series of time stamps.

13. The method of claim 1, wherein the time related data comprises a clock signal; and further including determining the first angular position for the mobile device about the first emitter array from at least first received value of the clock signal.

14. The method of claim 1, wherein the time related data comprises a periodic non-audible radio frequency chirp; and further including determining the first angular position for the mobile device about the first emitter array from at least first received value of the Periodic non-audible radio frequency chirp.

15. The method of claim 1, further including receiving the time related data transmitted via a separate channel.

16. The method of claim 1, further including receiving the time related data transmitted via a sub channel.

17. The method of claim 1, wherein sweep patterns of the first and second swept beam-formed signals define respective planes that are not parallel, thereby enabling the mobile device to determine position in greater than a single plane within the building and without a need to query another device.

18. The method of claim 1, further including the mobile device capturing images of a user's hand and interpreting touch-free gestures made by the user's hand moving freely in space.

19. The method of claim 18, further including the mobile device providing position based home control, responsive to biometric aware location and identification of the user of the mobile device.

20. A system, including:
a plurality of emitter arrays situated inside of a building, including at least:
a first emitter array emitting a first swept beam-formed signal including a beat of amplitude of a first mix of multiple frequencies comprising the first swept beam-formed signal; and
a second emitter array emitting a second swept beam-formed signal including a beat of amplitude of a second mix of multiple frequencies comprising the second swept beam-formed signal; and
wherein the first and second swept beam-formed signals are associated with time related data that varies according to sweep of beats of amplitude of the first and second swept beam-formed signals; and
one or more mobile devices also located inside the building, each mobile device including one or more processors and a memory storing instructions for providing guidance to user of a mobile device relative to the plurality of emitter arrays in the building, which instructions when executed by the one or more processors perform actions including:
receiving in a mobile device at least first and second swept beam-formed signals emitted by first and second emitter arrays situated within a building;
detecting by the mobile device, from a beat of amplitude of the first mix of multiple frequencies comprising the first swept beam-formed signal during a sweep of the first swept beam-formed signal, a first value of time related data corresponding to receipt of a maximum amplitude for the first swept beam-formed signal;
determining by the mobile device, a first angular position for the mobile device about the first emitter array from at least first value of the time related data corresponding to receipt of a maximum amplitude;
detecting by the mobile device, from a beat of amplitude of the second mix of multiple frequencies comprising the second swept beam-formed signal during a sweep of the second swept beam-formed signal, a second value of time related data corresponding to receipt of a maximum amplitude for the second swept beam-formed signal;

determining by the mobile device, a second angular position for the mobile device about the second emitter array from at least second value of the time related data corresponding to receipt of a maximum amplitude; and determining from the first angular position for the mobile device about the first emitter array and the second angular position for the mobile device about the second emitter array, a location of the mobile device within the building.

\* \* \* \* \*